United States Patent
Seok

(10) Patent No.: US 11,487,660 B2
(45) Date of Patent: Nov. 1, 2022

(54) DATA STORAGE DEVICE FOR IMPROVING READ PERFORMANCE AND METHOD OF OPERATING THE SAME

(71) Applicant: SK hynix Inc., Gyeonggi-do (KR)

(72) Inventor: Ji Hoon Seok, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 56 days.

(21) Appl. No.: 16/950,429

(22) Filed: Nov. 17, 2020

(65) Prior Publication Data

US 2022/0012174 A1 Jan. 13, 2022

(30) Foreign Application Priority Data

Jul. 9, 2020 (KR) .................. 10-2020-0084913

(51) Int. Cl.
*G06F 12/00* (2006.01)
*G06F 12/0802* (2016.01)
*G06F 3/06* (2006.01)

(52) U.S. Cl.
CPC ........ *G06F 12/0802* (2013.01); *G06F 3/0604* (2013.01); *G06F 3/0655* (2013.01); *G06F 3/0679* (2013.01); *G06F 2212/60* (2013.01); *G06F 2212/72* (2013.01)

(58) Field of Classification Search
CPC .. G06F 12/0802; G06F 3/0604; G06F 3/0655; G06F 3/0679; G06F 2212/60; G06F 2212/72

USPC ......................................................... 711/118
See application file for complete search history.

(56) References Cited

U.S. PATENT DOCUMENTS

2021/0096984 A1* 4/2021 Luo .................... G06F 13/1668

FOREIGN PATENT DOCUMENTS

| KR | 10-2015-0037367 | 4/2015 |
| KR | 10-1826073 | 2/2018 |

OTHER PUBLICATIONS

Jedec, Universal Flash Storage (UFS) Host Performance Booster(HPB) Extension Version 1.0, JESD220-3, Jan. 2020.

* cited by examiner

*Primary Examiner* — Mardochee Chery
(74) *Attorney, Agent, or Firm* — IP & T Group LLP

(57) ABSTRACT

A storage device communicates with a host including a host memory. The storage device includes a semiconductor memory device and a device memory. The semiconductor memory device includes a plurality of non-volatile memory cells. The device memory stores validity information of host performance booster (HPB) sub-regions included in each of HPB regions cached in the host memory. The storage device determines to deactivate at least one HPB region among the HPB regions cached in the host memory based on the validity information included in the device memory, and transfers a message recommending to deactivate the determined HPB region to the host.

14 Claims, 19 Drawing Sheets

FIG. 14B

| Region No. | SR No. | Ref. Value |
|---|---|---|
| 0 | 0 | 0 |
|   | 1 | W1 |
|   | 2 | 0 |
|   | 3 | 0 |
|   | 4 | W2 |
|   | ... | ... |
| 1 | 0 | 0 |
|   | 1 | 0 |
|   | 2 | W2 |
|   | 3 | W2 |
|   | 4 | W1 |
|   | ... | ... |

| Region No. | SR No. | Ref. Value |
|---|---|---|
| 0 | 0 | 0 |
|   | 1 | W3 |
|   | 2 | 0 |
|   | 3 | W4 |
|   | 4 | 0 |
|   | ... | ... |
| 1 | 0 | 0 |
|   | 1 | W3 |
|   | 2 | 0 |
|   | 3 | W5 |
|   | 4 | W5 |
|   | ... | ... |

DATA STORAGE DEVICE FOR IMPROVING READ PERFORMANCE AND METHOD OF OPERATING THE SAME

CROSS-REFERENCE TO RELATED APPLICATION

The present application claims priority under 35 U.S.C. § 119(a) to Korean patent application number 10-2020-0084913, filed on Jul. 9, 2020, which is incorporated herein by reference in its entirety.

BACKGROUND

Field of Invention

The present disclosure relates to an electronic device, and more particularly, to a storage device and a method of operating the same.

Description of Related Art

A semiconductor memory device may be formed in a two-dimensional structure in which strings are horizontally arranged on a semiconductor substrate, or in a three-dimensional structure in which the strings are vertically stacked on the semiconductor substrate. A three-dimensional semiconductor memory device was designed to resolve a limit of integration of a two-dimensional semiconductor memory device, and may include a plurality of memory cells that are vertically stacked on a semiconductor substrate. A controller may control an operation of the semiconductor memory device according to a command from a host. The storage device includes the controller and the semiconductor memory device.

SUMMARY

An embodiment of the present disclosure provides a storage device capable of improving read performance and a method of operating the same.

A storage device according to an embodiment of the present disclosure communicates with a host including a host memory. The storage device includes a semiconductor memory device and a device memory. The semiconductor memory device includes a plurality of non-volatile memory cells. The device memory stores validity information of host performance booster (HPB) sub-regions included in each of HPB regions cached in the host memory. The storage device is configured to determine to deactivate at least one HPB region among the HPB regions cached in the host memory based on the validity information included in the device memory, and transfer a message to the host recommending to deactivate the determined HPB region.

In an embodiment, the validity information may be represented in a validity bitmap indicating whether the HPB sub-regions in the HPB regions cached in the host memory are valid.

In an embodiment, the storage device may be further configured to select the HPB region to be deactivated based on the validity rate derived from the validity information of the HPB sub-regions included in each of the HPB regions cached in the host memory.

In an embodiment, the storage device may select an HPB region having a lowest validity rate of the HPB regions.

A storage device according to an embodiment of the present disclosure communicates with a host including a host memory. The storage device includes a semiconductor memory device and a device memory. The semiconductor memory device includes a plurality of non-volatile memory cells. The device memory stores a priority table for determining a host performance booster (HPB) sub-region to be cached in the host memory. The storage device is configured to update the priority table based on a read command received from the host and to transfer, to the host, a message recommending the HPB sub-region to be cached in the host memory based on the priority table.

In an embodiment, the priority table may include priority reference values for a plurality of HPB sub-regions, respectively, included in each of the plurality of HPB regions.

In an embodiment, the priority reference value of the HPB sub-region corresponding to a HPB read command received from the host may be increased by a first weight in response to the HPB read command, and the priority reference value of the HPB sub-region corresponding to a normal read command received from the host may be increased by a second weight different from the first weight in response to the normal read command.

In an embodiment, the priority reference value of the HPB sub-region corresponding to a normal read command received from the host may be increased by a third weight in response to the normal read command, the priority reference value of the HPB sub-region corresponding to a HPB read command received from the host may be increased by a fourth weight in response to the received HPB read command when the HPB sub-region corresponding to the received HPB read command is valid, and the priority reference value of the HPB sub-region corresponding to the received HPB read command may be increased by a fifth weight in response to the received HPB read command when the HPB sub-region corresponding to the received HPB read command is invalid.

In an embodiment, the fifth weight may be greater than the fourth weight.

A method of operating a storage device communicating with a host including a host memory according to still another embodiment of the present disclosure includes determining to deactivate any one of a plurality of host performance booster (HPB) regions cached in the host memory, selecting any one of the plurality of HPB regions based on validity rates of the plurality of HPB regions cached in the host memory, and transferring, to the host, a message recommending to deactivate the selected HPB region.

In an embodiment, in selecting any one of the plurality of HPB regions, an HPB region having a lowest validity rate, among the plurality of HPB regions cached in the host memory, is selected.

A method of operating a storage device communicating with a host including a host memory according to still another embodiment of the present disclosure includes receiving a read command from the host, and updating a priority reference value for determining a host performance booster (HPB) sub-region to be cached in the host memory based on a characteristic of the read command.

In an embodiment, updating the priority reference value may include determining whether the read command is an HPB read command or a normal read command, and increasing the priority reference value of a HPB sub-region corresponding to the read command by a first weight or a second weight different from the first weight according to a result of determining.

In an embodiment, when the read command is the HPB read command, the priority reference value of the HPB sub-region corresponding to the read command may be increased by the first weight.

In an embodiment, when the read command is the normal read command, the priority reference value of the HPB sub-region corresponding to the read command may be increased by the second weight.

In an embodiment, updating the priority reference value may include determining whether a HPB sub-region corresponding to the HPB read command is valid when the read command is the HPB read command, and increasing the priority reference value of the HPB sub-region corresponding to the HPB read command by a third weight or a fourth weight different from the third weight according to a result of the determining.

In an embodiment, when the HPB sub-region corresponding to the HPB read command is valid, the priority reference value of the HPB sub-region may be increased by the third weight.

In an embodiment, when the HPB sub-region corresponding to the HPB read command is invalid, the priority reference value of the HPB sub-region may be increased by the fourth weight.

In an embodiment, the method may further include transferring read data to the host by performing a read operation corresponding to the read command.

In an embodiment, the method may further include transferring, to the host, a message recommending caching an HPB sub-region having a greatest priority reference value in the host memory.

An operating method of a host performance booster (HPB) according to still another embodiment of the present disclosure includes deactivating a currently activated higher group of map data, in which a number of invalid lower groups of map data is greater than a threshold, and activating a currently deactivated and valid lower group of map data having a highest priority among all lower groups of map data. The priority increases whenever reading data related to a corresponding lower group of map data. An increment of the priority is different depending on whether the corresponding lower group is activated or whether the corresponding lower group, which is activated, is valid.

The present technology may provide a storage device capable of improving read performance and a method of operating the same.

BRIEF DESCRIPTION OF THE DRAWINGS

FIG. 14B is a diagram illustrating a priority table including a priority reference value managed according to FIG. 14A.

DETAILED DESCRIPTION

Specific structural and functional description is provided herein only to describe the embodiments of the present disclosure. The invention, however, may be configured in various forms and carried out in various ways; thus, the invention is not limited to the disclosed embodiments. Also, throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Figure 1:
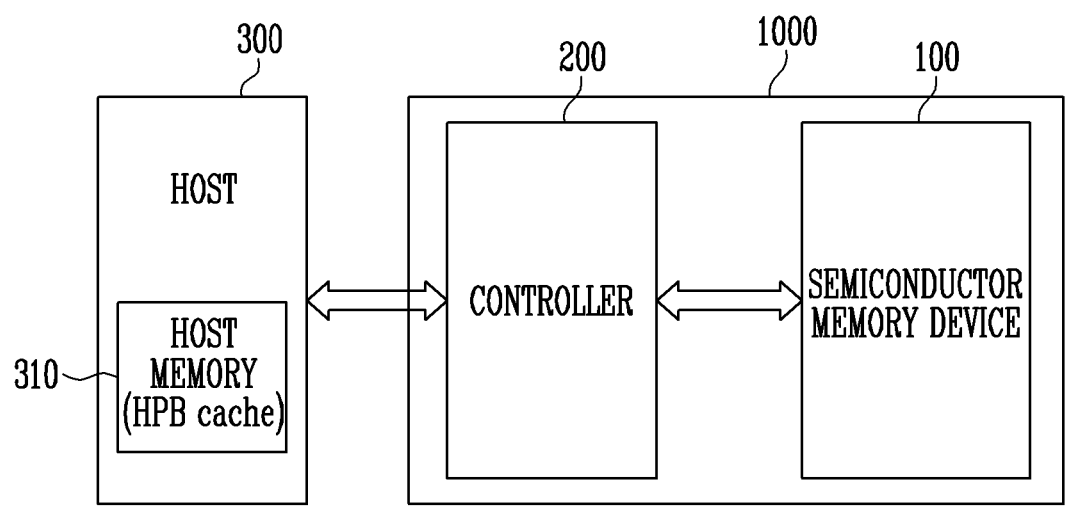
FIG. 1 is a block diagram illustrating a storage device including a controller according to an embodiment of the present disclosure.

FIG. 1 is a block diagram illustrating a storage device including a controller according to an embodiment of the present disclosure.

Referring to FIG. 1, the storage device 1000 includes a semiconductor memory device 100 and a controller 200. In addition, the storage device 1000 communicates with a host 300. The controller 200 controls overall operation of the semiconductor memory device 100. In addition, the controller 200 controls an operation of the semiconductor memory device 100 based on a command request received from the host 300.

The semiconductor memory device 100 operates under control of the controller 200. The semiconductor memory device 100 includes a memory cell array having a plurality of memory blocks. In an embodiment, the semiconductor memory device 100 may be a flash memory device.

The controller 200 may receive a write command, a read command, and the like of data from the host, and control the semiconductor memory device 100 based on the received commands. More specifically, the controller 200 may generate commands for controlling the operation of the semiconductor memory device 100 and transmit the commands to the semiconductor memory device 100.

The semiconductor memory device 100 is configured to receive a command and an address from the controller 200 and to access an area selected by the address of the memory cell array. That is, the semiconductor memory device 100 performs an internal operation corresponding to a command on the area selected by the address.

For example, the semiconductor memory device 100 may perform a program operation, a read operation, and an erase operation. During the program operation, the semiconductor memory device 100 may program data in the area selected by the address. During the read operation, the semiconductor memory device 100 may read data from the area selected by the address. During the erase operation, the semiconductor memory device 100 may erase data stored in the area selected by the address.

The host 300 may include any of various electronic devices such as portable electronic devices such as a mobile phone, an MP3 player, and a laptop computer, or non-portable electronic devices such as a desktop computer, a game machine, a TV, and a projector, that is, wired and wireless electronic devices. In addition, the host 300 includes at least one operating system (OS), and the operating system generally manages and controls a function and an operation of the host 300 and provides interaction between the host 300 and a user using the storage device 1000. Here, the OS may support a function and an operation corresponding to a use object and purpose of a user. For example, the OS may be divided into a general OS and a mobile OS according to mobility of the host 300. In addition, the general OS in the OS may be divided into a personal OS and an enterprise OS according to a use environment of the user. For example, the personal OS may support a service provision function for a general user, and include windows, chrome, and the like. The enterprise OS may secure and support high performance, and include a windows server, linux, unix, and the like. In addition, the mobile OS in the OS may support a mobility service provision function and a power saving function of the system to users, and include Android, iOS, windows mobile, and the like. The host 300 may include a plurality of OSs, and executes the OS for operation performance with the storage device 1000 corresponding to a user request. Here, the host 300 transmits a plurality of commands corresponding to the user request to the storage device 1000, and thus the storage device 1000 performs operations corresponding to the commands, that is, operations corresponding to the user request. Regarding control of the storage device 1000, the host 300 may include a file system configured in the OS or configured separately from the OS.

The host 300 may include a host memory 310. At least a portion of the entire storage region of the host memory 310 may include a host performance booster (hereinafter HPB) cache region for a HPB function. The HPB function may refer to a function of caching at least a portion of map data of the storage device 1000 in the host memory 310 and using at least the portion of the map data. The HPB function is described below with reference to FIGS. 7 to 11.

Figure 2:
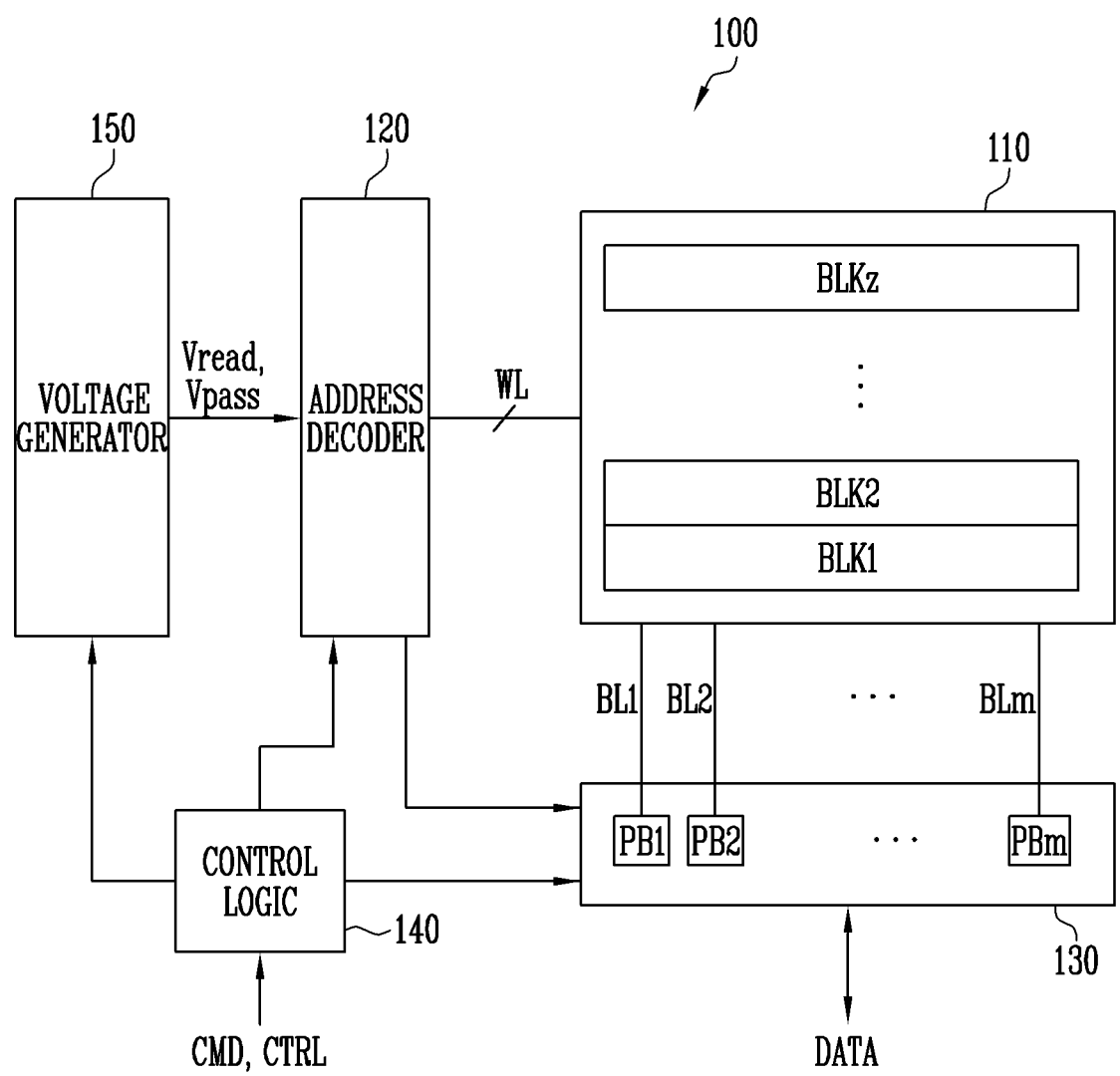
FIG. 2 is a block diagram illustrating a semiconductor memory device according to an embodiment of the present disclosure.

FIG. 2 is a block diagram illustrating a semiconductor memory device according to an embodiment of the present disclosure.

Referring to FIG. 2, the semiconductor memory device 100 includes a memory cell array 110, an address decoder 120, a read and write circuit 130, control logic 140, and a voltage generator 150.

The memory cell array 110 includes a plurality of memory blocks BLK1 to BLKz, which are connected to the address decoder 120 through word lines WL. The plurality of memory blocks BLK1 to BLKz are connected to the read and write circuit 130 through bit lines BL1 to BLm. Each of the plurality of memory blocks BLK1 to BLKz includes a plurality of memory cells. In an embodiment, the plurality of memory cells are non-volatile memory cells, and may be configured of non-volatile memory cells having a vertical channel structure. The memory cell array 110 may be configured as a memory cell array of a two-dimensional structure. According to an embodiment, the memory cell array 110 may be configured as a memory cell array of a three-dimensional structure. Each of the plurality of memory cells in the memory cell array may store at least one bit of data. In embodiments, each of the plurality of memory cells in the memory cell array 110 may be a single-level cell (SLC) storing one bit of data, a multi-level cell (MLC) storing two bits of data, a triple-level cell (TLC) storing three bits of data, or a quad-level cell (QLC) storing four bits of data. In another embodiment, the memory cell array 110 may include a plurality of memory cells each storing five or more bits of data.

The address decoder 120, the read and write circuit 130, the control logic 140, and the voltage generator 150 operate as a peripheral circuit driving the memory cell array 110. The address decoder 120 is connected to the memory cell array 110 through the word lines WL. The address decoder 120 is configured to operate in response to control of the control logic 140. The address decoder 120 receives an address through an input/output buffer (not shown) inside the semiconductor memory device 100.

The address decoder 120 is configured to decode a block address among received addresses. The address decoder 120 selects at least one memory block according to the decoded block address. In addition, the address decoder 120 applies a read voltage Vread generated in the voltage generator 150 to a selected word line of the selected memory block at a time of a read voltage application operation during a read operation, and applies a pass voltage Vpass to the remaining unselected word lines. In addition, during a program verify operation, the address decoder 120 applies a verify voltage generated in the voltage generator 150 to the selected word line of the selected memory block, and applies the pass voltage Vpass to the remaining unselected word lines.

The address decoder 120 is configured to decode a column address of the received addresses. The address decoder 120 transmits the decoded column address to the read and write circuit 130.

A read operation and a program operation of the semiconductor memory device 100 are performed in a page unit. Addresses received at a time of a request of the read operation and the program operation include a block address, a row address, and a column address. The address decoder 120 selects one memory block and one word line according to the block address and the row address. The column address is decoded by the address decoder 120 and is provided to the read and write circuit 130.

The address decoder 120 may include a block decoder, a row decoder, a column decoder, an address buffer, and the like.

The read and write circuit 130 includes a plurality of page buffers PB1 to PBm. The read and write circuit 130 may operate as a "read circuit" during a read operation of the memory cell array 110 and may operate as a "write circuit" during a write operation of the memory cell array 110. The plurality of page buffers PB1 to PBm are connected to the memory cell array 110 through the bit lines BL1 to BLm. During the read operation and the program verify operation, in order to sense a threshold voltage of the memory cells, the plurality of page buffers PB1 to PBm senses a change of an amount of a current flowing according to a programmed state of a corresponding memory cell through a sensing node while continuously supplying a sensing current to the bit lines connected to the memory cells, and latches the sensed change as sensing data. The read and write circuit 130 operates in response to page buffer control signals output from the control logic 140.

During the read operation, the read and write circuit 130 senses data of the memory cell, temporarily stores read data, and outputs data DATA to the input/output buffer (not shown) of the semiconductor memory device 100. In an embodiment, the read and write circuit 130 may include a column selection circuit, and the like, in addition to the page buffers (or page registers).

The control logic 140 is connected to the address decoder 120, the read and write circuit 130, and the voltage generator 150. The control logic 140 receives a command CMD and a control signal CTRL through the input/output buffer (not shown) of the semiconductor memory device 100. The control logic 140 is configured to control overall operation of the semiconductor memory device 100 in response to the control signal CTRL. In addition, the control logic 140 outputs a control signal for adjusting a sensing node precharge potential level of the plurality of page buffers PB1 to PBm. The control logic 140 may control the read and write circuit 130 to perform the read operation of the memory cell array 110.

The voltage generator 150 generates the read voltage Vread and the pass voltage Vpass during the read operation in response to the control signal output from the control logic 140. In order to generate a plurality of voltages having various voltage levels, the voltage generator 150 may include a plurality of pumping capacitors that receive an internal power voltage, and generate the plurality of voltages by selectively activating the plurality of pumping capacitors in response to the control of the control logic 140.

The address decoder 120, the read and write circuit 130, and the voltage generator 150 may function as a "peripheral circuit" that performs a read operation, a write operation, and an erase operation on the memory cell array 110. The peripheral circuit performs the read operation, the write operation, and the erase operation on the memory cell array 110 based on the control of the control logic 140.

Figure 3:
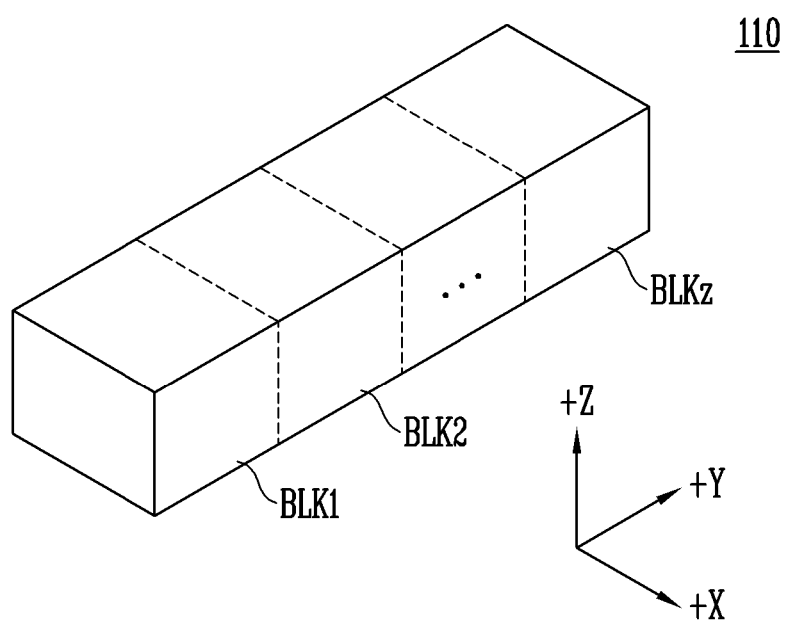
FIG. 3 is a diagram illustrating an embodiment of a memory cell array of FIG. 2.

FIG. 3 is a diagram illustrating an embodiment of the memory cell array of FIG. 2.

Referring to FIG. 3, the memory cell array 110 includes a plurality of memory blocks BLK1 to BLKz. Each memory block may have a three-dimensional structure. Each memory block includes a plurality of memory cells stacked on a substrate. Such plurality of memory cells are arranged along a +X direction, a +Y direction, and a +Z direction. A structure of each memory block is described in more detail with reference to FIGS. 4 and 5.

Figure 4:
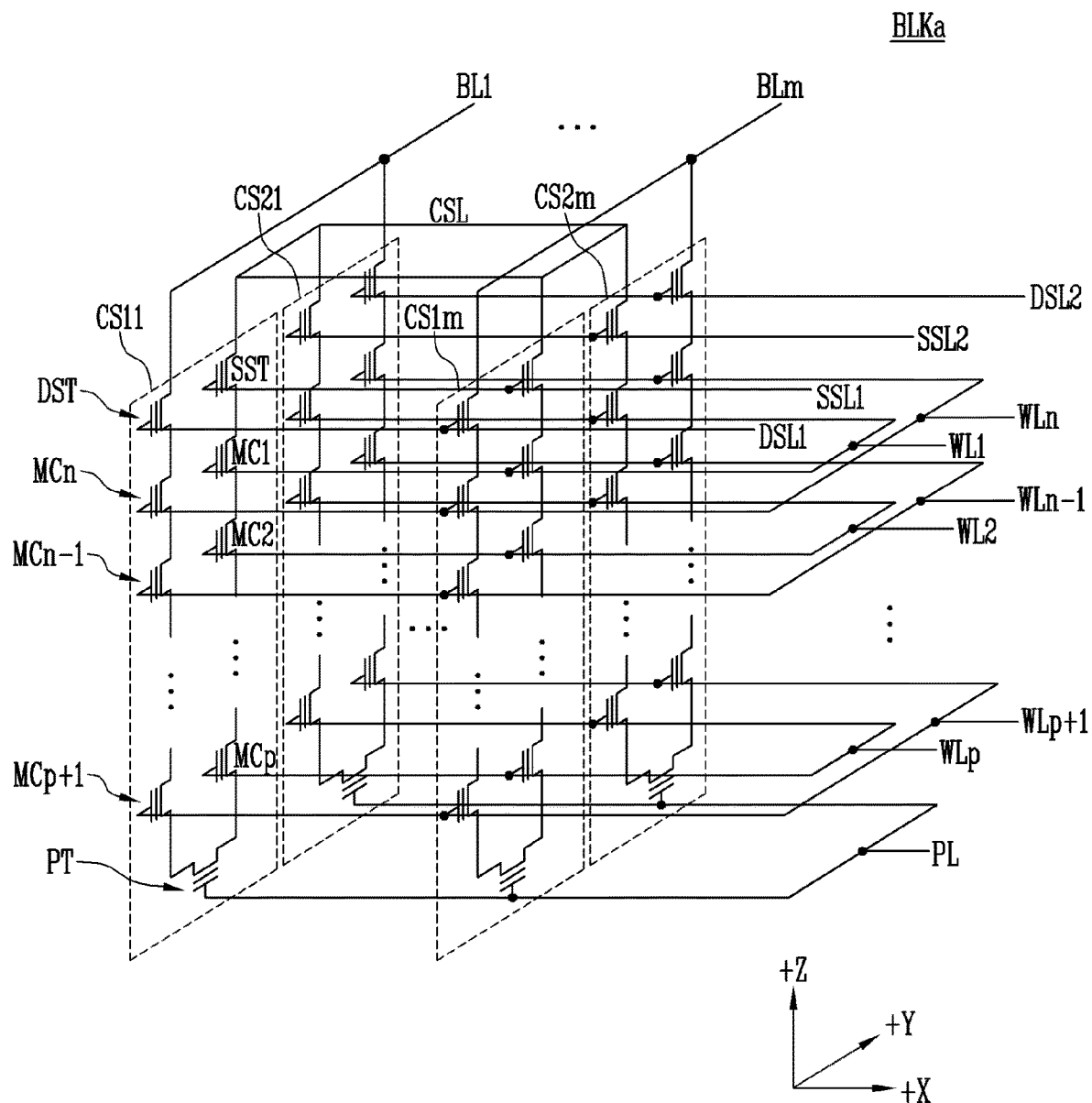
FIG. 4 is a circuit diagram illustrating any one memory block BLKa of memory blocks BLK1 to BLKz of FIG. 3.

FIG. 4 is a circuit diagram illustrating any one memory block BLKa of the memory blocks BLK1 to BLKz of FIG. 3.

Referring to FIG. 4, the memory block BLKa includes a plurality of cell strings CS11 to CS1m and CS21 to CS2m. In an embodiment, each of the plurality of cell strings CS11 to CS1m and CS21 to CS2m may be formed in a 'U' shape. In the memory block BLKa, m cell strings are arranged in a row direction (that is, the +X direction). In FIG. 4, two cell strings are arranged in a column direction (that is, the +Y direction). However, this is for clarity; three or more cell strings may be arranged in the column direction.

Each of the plurality of cell strings CS11 to CS1m and CS21 to CS2m includes at least one source select transistor SST, first to n-th memory cells MC1 to MCn, a pipe transistor PT, and at least one drain select transistor DST.

Each of the select transistors SST and DST and the memory cells MC1 to MCn may have a similar structure. In an embodiment, each of the select transistors SST and DST and the memory cells MC1 to MCn may include a channel layer, a tunneling insulating film, a charge storage film, and a blocking insulating film. In an embodiment, a pillar for providing the channel layer may be provided in each cell string. In an embodiment, a pillar for providing at least one of the channel layer, the tunneling insulating film, the charge storage film, and the blocking insulating film may be provided in each cell string.

The source select transistor SST of each cell string is connected between a common source line CSL and the memory cells MC1 to MCp.

In an embodiment, the source select transistors of the cell strings arranged in the same row are connected to a source select line extending in the row direction, and the source select transistors of the cell strings arranged in different rows are connected to different source select lines. In FIG. 4, the source select transistors of the cell strings CS11 to CS1m of a first row are connected to a first source select line SSL1. The source select transistors of the cell strings CS21 to CS2m of a second row are connected to a second source select line SSL2.

As another embodiment, the source select transistors of the cell strings CS11 to CS1m and CS21 to CS2m may be commonly connected to one source select line.

The first to n-th memory cells MC1 to MCn of each cell string are connected between the source select transistor SST and the drain select transistor DST.

The first to n-th memory cells MC1 to MCn may be divided into first to p-th memory cells MC1 to MCp and (p+1)-th to n-th memory cells MCp+1 to MCn. The first to p-th memory cells MC1 to MCp are sequentially arranged in a −Z direction, and are connected in series between the source select transistor SST and the pipe transistor PT. The (p+1)-th to n-th memory cells MCp+1 to MCn are sequentially arranged in the +Z direction, and are connected in series between the pipe transistor PT and the drain select transistor DST. The first to p-th memory cells MC1 to MCp and the (p+1)-th to n-th memory cells MCp+1 to MCn are connected to each other through the pipe transistor PT. Gates of the first to n-th memory cells MC1 to MCn of each cell string are connected to the first to n-th word lines WL1 to WLn, respectively.

A gate of the pipe transistor PT of each cell string is connected to a pipeline PL.

The drain select transistor DST of each cell string is connected between a corresponding bit line and the memory cells MCp+1 to MCn. The cell strings arranged in the row direction are connected to the drain select line extending in the row direction. The drain select transistors of the cell strings CS11 to CS1m of the first row are connected to a first drain select line DSL1. The drain select transistors of the cell strings CS21 to CS2m of the second row are connected to a second drain select line DSL2.

The cell strings arranged in the column direction are connected to the bit lines extending in the column direction. In FIG. 4, the cell strings CS11 and CS21 of the first column are connected to the first bit line BL1. The cell strings CS1m and CS2m of the m-th column are connected to the m-th bit line BLm.

The memory cells connected to the same word line in the cell strings arranged in the row direction configure one page. For example, the memory cells connected to the first word line WL1, among the cell strings CS11 to CS1m of the first row configure one page. The memory cells connected to the first word line WL1, among the cell strings CS21 to CS2m of the second row configure another page. The cell strings arranged in one row direction may be selected by selecting either of the drain select lines DSL1 and DSL2. One page of the selected cell strings may be selected by selecting any one of the word lines WL1 to WLn.

In another embodiment, even bit lines and odd bit lines may be provided instead of the first to m-th bit lines BL1 to BLm. In addition, even-numbered cell strings among the cell strings CS11 to CS1m or CS21 to CS2m arranged in the row direction may be connected to the bit lines, and odd-numbered cell strings among the cell strings CS11 to CS1m or CS21 to CS2m arranged in the row direction may be connected to odd bit lines, respectively.

In an embodiment, at least one of the first to n-th memory cells MC1 to MCn may be used as a dummy memory cell. For example, at least one dummy memory cell is provided to reduce an electric field between the source select transistor SST and the memory cells MC1 to MCp. Alternatively, at least one dummy memory cell is provided to reduce an electric field between the drain select transistor DST and the memory cells MCp+1 to MCn. As more dummy memory cells are provided, reliability of an operation for the memory block BLKa is improved, however, the size of the memory block BLKa increases. As less memory cells are provided, the size of the memory block BLKa may be reduced; however, the reliability of the operation for the memory block BLKa may be reduced.

In order to efficiently control the dummy memory cell(s), each of the dummy memory cells may have a required threshold voltage. Before or after an erase operation for the memory block BLKa, program operations for all or a part of the dummy memory cells may be performed. When the erase operation is performed after the program operation is performed, the dummy memory cells may have the required threshold voltage by controlling a voltage applied to dummy word lines connected to the respective dummy memory cells.

Figure 5:
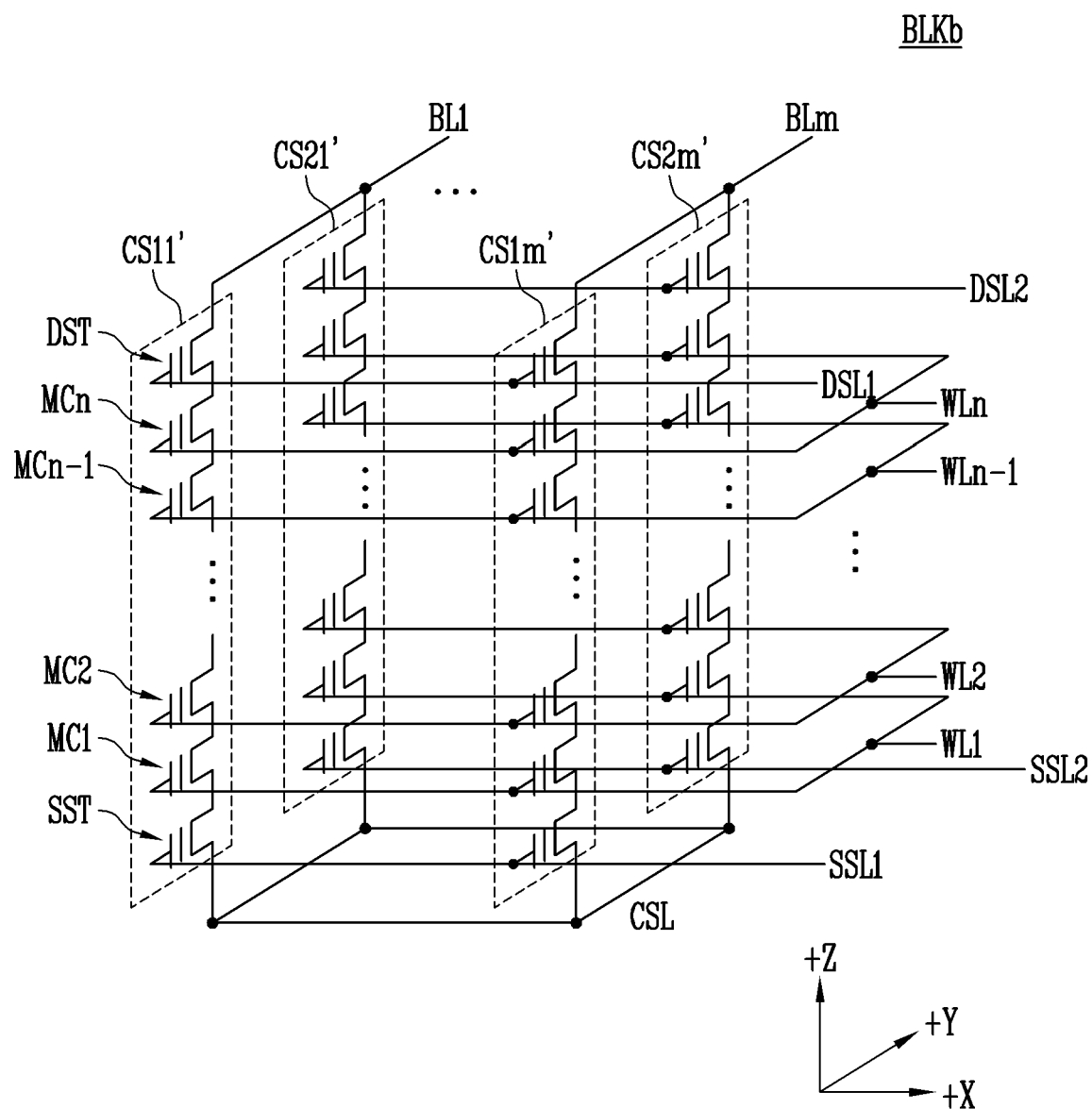
FIG. 5 is a circuit diagram illustrating another embodiment of any one memory block BLKb of the memory blocks BLK1 to BLKz of FIG. 3.

FIG. 5 is a circuit diagram illustrating another embodiment of any one memory block BLKb of the memory blocks BLK1 to BLKz of FIG. 3.

Referring to FIG. 5, the memory block BLKb includes a plurality of cell strings CS11' to CS1m' and CS21' to CS2m'. Each of the plurality of cell strings CS11' to CS1m' and CS21' to CS2m' extends along a +Z direction. Each of the plurality of cell strings CS11' to CS1m' and CS21' to CS2m' includes at least one source select transistor SST, first to n-th memory cells MC1 to MCn, and at least one drain select transistor DST stacked on a substrate (not shown) under the memory block BLKb.

The source select transistor SST of each cell string is connected between a common source line CSL and memory cells MC1 to MCn. The source select transistors of the cell strings arranged in the same row are connected to the same source select line. The source select transistors of the cell strings CS11' to CS1m' arranged in a first row are connected to a first source select line SSL1. The source select transistors of the cell strings CS21' to CS2m' arranged in a second row are connected to a second source select line SSL2. In another embodiment, the source select transistors of the cell strings CS11' to CS1m' and CS21' to CS2m' may be commonly connected to one source select line.

The first to n-th memory cells MC1 to MCn of each cell string are connected in series between the source select transistor SST and the drain select transistor DST. Gates of the first to n-th memory cells MC1 to MCn are connected to first to the n-th word lines WL1 to WLn, respectively.

The drain select transistor DST of each cell string is connected between a corresponding bit line and the memory cells MC1 to MCn. The drain select transistors of the cell strings arranged in the row direction are connected to a drain select line extending in the row direction. The drain select transistors of the cell strings CS11' to CS1m' of a first row are connected to a first drain select line DSL1. The drain select transistors of the cell strings CS21' to CS2m' of a second row are connected to a second drain select line DSL2.

As a result, the memory block BLKb of FIG. 5 has an equivalent circuit similar to that of memory block BLKa of FIG. 4 except that the pipe transistor PT is excluded from each cell string.

In another embodiment, even bit lines and odd bit lines may be provided instead of the first to m-th bit lines BL1 to BLm. In addition, even-numbered cell strings among the cell strings CS11' to CS1m' or CS21' to CS2m' arranged in the row direction may be connected to even bit lines, and odd-numbered cell strings among the cell strings CS11' to CS1m' or CS21' to CS2m' arranged in the row direction may be connected to odd bit lines, respectively.

In an embodiment, at least one of the first to n-th memory cells MC1 to MCn may be used as a dummy memory cell. For example, at least one dummy memory cell is provided to reduce an electric field between the source select transistor SST and the memory cells MC1 to MCn. Alternatively, at least one dummy memory cell is provided to reduce an electric field between the drain select transistor DST and the memory cells MC1 to MCn. As more dummy memory cells are provided, reliability of an operation for the memory block BLKb is improved, however, the size of the memory block BLKb increases. As less memory cells are provided, the size of the memory block BLKb may be reduced, however, the reliability of the operation for the memory block BLKb may be reduced.

In order to efficiently control the dummy memory cell(s), each of the dummy memory cells may have a required threshold voltage. Before or after an erase operation for the memory block BLKb, program operations for all or a part of the dummy memory cells may be performed. When the erase operation is performed after the program operation is performed, the dummy memory cells may have the required threshold voltage by controlling a voltage applied to the dummy word lines connected to the respective dummy memory cells.

Figure 6:
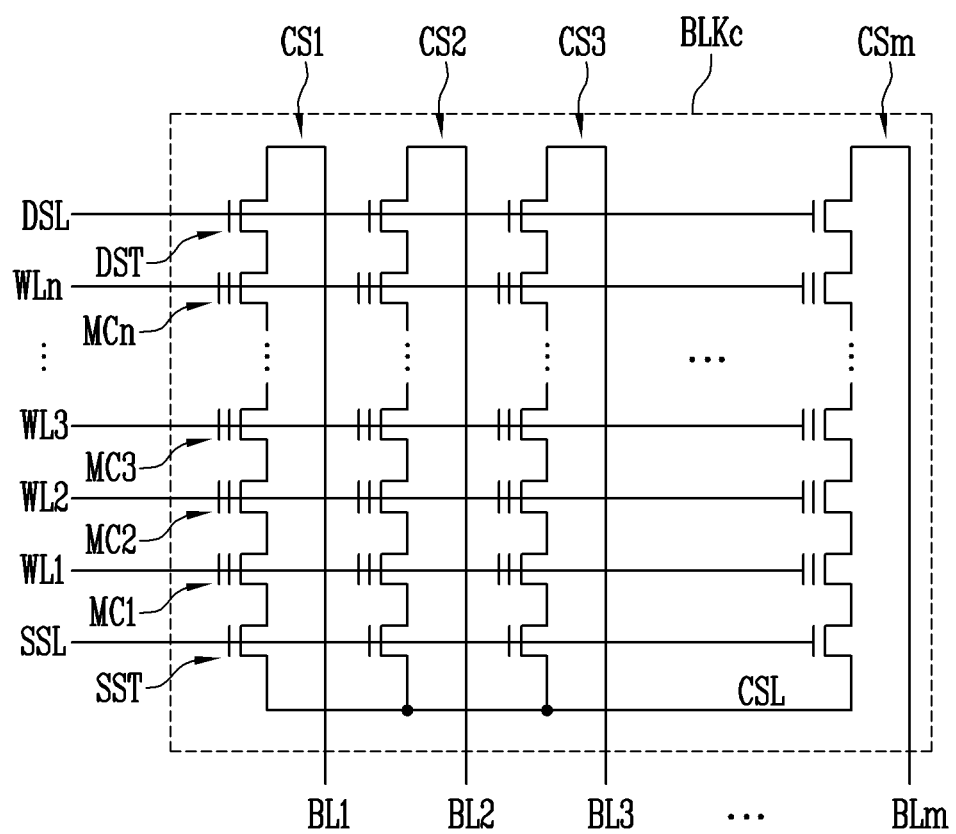
FIG. 6 is a circuit diagram illustrating an embodiment of any one memory block BLKc of the memory blocks BLK1 to BLKz in the memory cell array of FIG. 2.

FIG. 6 is a circuit diagram illustrating an embodiment of any one memory block BLKc of the memory blocks BLK1 to BLKz included in the memory cell array 110 of FIG. 2.

Referring to FIG. 6, the memory block BLKc includes a plurality of cell strings CS1 to CSm. The plurality of cell strings CS1 to CSm may be connected to a plurality of bit lines BL1 to BLm, respectively. Each of the cell strings CS1 to CSm includes at least one source select transistor SST, first to n-th memory cells MC1 to MCn, and at least one drain select transistor DST.

Each of the select transistors SST and DST and the memory cells MC1 to MCn may have a similar structure. In an embodiment, each of the select transistors SST and DST and the memory cells MC1 to MCn may include a channel layer, a tunneling insulating film, a charge storage film, and a blocking insulating film. In an embodiment, a pillar for providing the channel layer may be provided in each cell string. In an embodiment, a pillar for providing at least one of the channel layer, the tunneling insulating film, the charge storage film, and the blocking insulating film may be provided in each cell string.

The source select transistor SST of each cell string is connected between a common source line CSL and the memory cells MC1 to MCn.

The first to n-th memory cells MC1 to MCn of each cell string are connected between the source select transistor SST and the drain select transistor DST.

The drain select transistor DST of each cell string is connected between a corresponding bit line and the memory cells MC1 to MCn.

Memory cells connected to the same word line configure one page. The cell strings CS1 to CSm may be selected by selecting the drain select line DSL. One page among the selected cell strings may be selected by selecting any one of the word lines WL1 to WLn.

In another embodiment, even bit lines and odd bit lines may be provided instead of the first to m-th bit lines BL1 to BLm. Even-numbered cell strings among the cell strings CS1 to CSm may be connected to even bit lines, and odd-numbered cell strings may be connected to odd bit lines, respectively.

Figure 7:
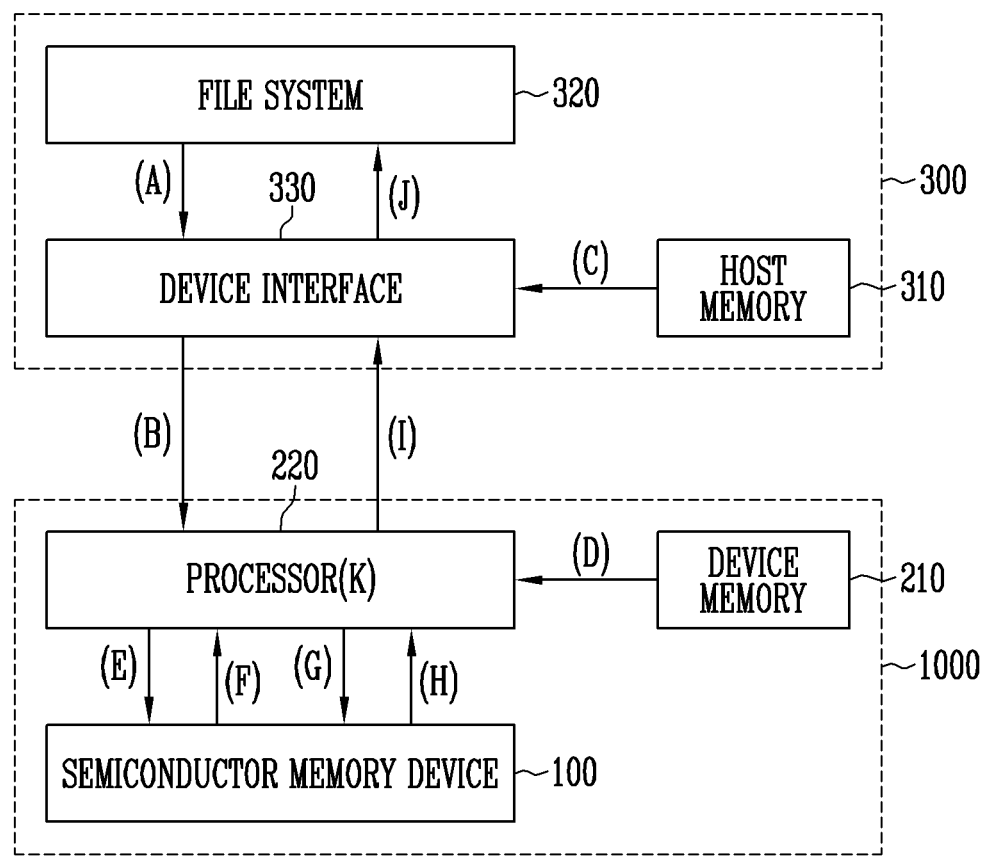
FIG. 7 is a block diagram illustrating a normal read operation and an HPB read operation between a host and a storage device according to an embodiment of the present disclosure.
Figure 8:
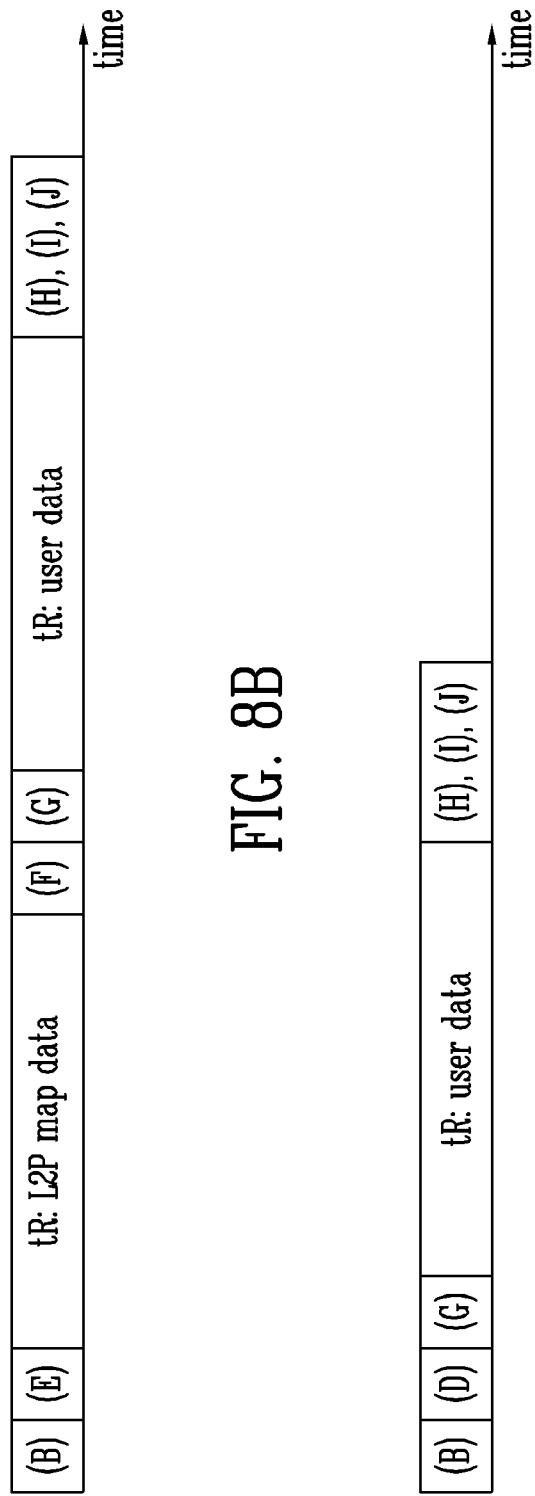
FIG. 8A is a timing diagram illustrating a data read operation when mapping information is cache-missed.
FIG. 8B is a timing diagram illustrating the data read operation when the mapping information is cache-hit in a device memory.
FIG. 8C is a timing diagram illustrating the data read operation when the mapping information is cache-hit in a host memory.

FIG. 7 is a block diagram illustrating a normal read operation and an HPB read operation between the host 300 and the storage device 1000 according to an embodiment of the present disclosure. Referring to FIG. 7, the host 300 may include a host memory 310, a file system 320, and a device interface 330. The storage device 1000 may include a semiconductor memory device 100, a device memory 210, and a processor 220. The device memory 210 and the processor 220 may be included in the controller 200 of FIG. 1. FIG. 7 focuses on components of the host 300 and the storage device 1000 related to operations of the present disclosure. However, neither the host 300 nor the storage device 1000 is limited to the components shown in FIG. 7.

Before describing FIG. 7, a basic operation of the storage device 1000 is described. In general, the storage device 1000 performs a write operation and a read operation in a page unit. In contrast, the storage device 1000 performs an erase operation in a memory block unit. Therefore, the storage device 1000 has limitations in performing the write operation, the read operation, and the erase operation, compared to a random access memory device (for example, a dynamic random access memory (DRAM) device or the like). Therefore, the storage device 1000 may include a flash translation layer (FTL) in the controller 200 and perform a command operation, an internal operation, or the like through the FTL. That is, the controller 200 may control the semiconductor memory device 100 according to a command received from the host 300. The controller 200 may perform an internal operation such as a garbage collection operation, a read reclaim operation, and a wear leveling operation, which are performed independently of instruction from the host 300. In other words, the controller 200 performs the above-described operations by executing the FTL implemented in software. The FTL may be executed by the processor 220 of the controller 200. Therefore, each of operations of the FTL is performed by the processor 220.

The operation performed by the command and the internal operation are performed by the FTL performing an address mapping operation of converting or translating a logical address (LA) provided from the host 300 into a physical address (PA) of the storage device 1000. However, in performing the address mapping operation using the FTL by the storage device 1000, mapping information between a logical block address (LBA) provided from the host 300 and a physical block address (PBA) of the storage device 1000 is used. The mapping information may be provided in a mapping table in which map data is stored, that is, a logical-to-physical mapping table (L2P mapping table). As the storage device 1000 is enlarged, a size of the mapping table is inevitably increased. As a result, the time it takes for the storage device 1000 to search the mapping table increases, which may reduce an operation speed of the storage device 1000. In order to solve such issue, a data processing system, which includes the host 300 and the storage device 1000, may have a plurality of host mapping tables in the host 300 and synchronize the mapping table of the storage device 1000 to a host mapping table to enable an address mapping operation to be preferentially performed in the host 300. Such an operation may be referred to as an HPB operation.

FIG. 7 is a diagram for performing a read operation based on the host mapping table included in the host 300 and a synchronization operation of the mapping table included in the storage device 1000.

The file system 320 of the host 300 generate data write and read commands, as needed, according to the OS. The host memory 310 may store the host mapping table. The host mapping table may include mapping information on all or some of user data stored in the semiconductor memory device 100. The device interface 330 may transfer a read command of data, a write command of data, and write data to the storage device 1000 based on control of the file system 320. In addition, the device interface 330 may transfer read data received from the storage device 1000 to the file system 320.

The device interface 330 may be included in the host 300 to facilitate exchange of data between the host 300 and the storage device 1000. The device interface 330 may be connected to the storage device 1000 through a parallel ATA (PATA) bus, a serial ATA (SATA) bus, a small computer system interface (SCSI), a universal serial bus (USB), peripheral component interconnect (PCI), peripheral component interconnect express (PCIe), a non-volatile memory express (NVMe) interface, or the like.

When the device interface 330 transfers the read command of data to the storage device 1000, the mapping information received from the host memory 310 may also be transferred. For example, when mapping information related to an LBA of data corresponding to the read command to be transferred to the storage device 1000 is included in the host mapping table stored in the host memory 310, the device interface 330 may transfer the LBA and the mapping information related to the LBA to the storage device 1000, together with the read command. When the mapping information related to the LBA of the data corresponding to the read command to be transferred to the storage device 1000 is not included in the host mapping table stored in the host memory 310, the device interface 330 may transfer only the read command and the LBA of data to the storage device 1000, without the mapping information of the LBA.

When the storage device 1000 receives a specific operation command from the host 300, the FTL executed by the processor 220 may generate a command for performing a corresponding command and transfer the command to the semiconductor memory device 100. For example, when the storage device 1000 receives a write command of data from the host 300, the FTL executed by the processor 220 may generate a program command and transfer the program command to the semiconductor memory device 100. In this case, program data may also be transferred to the semiconductor memory device 100 together with the program command. When the storage device 1000 receives a read command of data from the host 300, the FTL executed by the processor 220 may generate a read command and transfer the read command to the semiconductor memory device 100.

During the program operation of data, the controller 200 may update mapping information related to the program data. The mapping table is also updated, based on update of the mapping information. The updated mapping table may be stored in the semiconductor memory device 100.

During the read operation of data, the controller 200 needs the mapping information related to the read data. When the mapping information corresponding to the read data is cached in the device memory 210, the controller 200 may generate a read command corresponding to the received read command and transfer the read command to the semiconductor memory device 100. When the mapping information corresponding to the read data is not cached in the device memory 210, the controller 200 first transfers the read command of the mapping information to the semiconductor memory device 100. After the semiconductor memory device 100 reads the mapping information and transfers the mapping information to the FTL, the FTL transfers the read command for reading data to the semiconductor memory device 100 together with a PBA according to the received mapping information from the semiconductor memory device 100. The semiconductor memory device reads data corresponding to the received read command and transfers the data to the FTL of the controller 200. The controller 200 transfers the received data to the host 300. The device interface 330 of the host 300 transfers the received data to the file system 320.

The device memory 210 of the storage device 1000 may be configured as a volatile memory. In one example, the device memory 210 may be configured as a DRAM device. In another embodiment, the device memory 210 may be configured as a static random access memory (SRAM) device.

In many cases, since the device memory 210 of the controller 200 included in the storage device 1000 has a capacity less than that of the host memory 310, a space for maintaining the mapping table is insufficient. According to the HPB operation, all or a part of the mapping table of the semiconductor memory device 100 is maintained in the host memory 310 to increase caching performance of the mapping table. In this case, the time it takes the storage device 1000 to translate a LBA to a corresponding PBA may be reduced since the host 300 performs the translation compared to a case where the mapping table is cached only in the device memory 210. Accordingly, a read speed of data between the host 300 and the storage device 1000 may increase.

FIG. 8A is a timing diagram illustrating a data read operation when the mapping information is cache-missed. FIG. 8B is a timing diagram illustrating the data read operation when the mapping information is cache-hit in the device memory 210. FIG. 8C is a timing diagram illustrating the data read operation when the mapping information is cache-hit in the host memory 310. Hereinafter, the data read operation when the mapping information is cache-missed and cache-hit is described with reference to these figures together with FIG. 7.

When the host 300 desires to read data, the file system 320 transfers a control signal to read corresponding data to the device interface 330 (A). When mapping information corresponding to the corresponding read data is stored in the host memory 310, the host memory 310 transfers the mapping information to the device interface 330. In this case, the device interface 330 may transfer the mapping information corresponding to the read command to the storage device 1000 together with the read command. When the mapping information corresponding to the read data is not stored in the host memory 310, the device interface 330 may transfer only the read command and the LBA of data to the storage device 1000 without the mapping information related to the LBA.

An operation in a case where the mapping information corresponding to the read data is not stored in the host memory 310 and is not also stored in the device memory 210 is shown in FIG. 8A. The device interface 330 transfers only the read command and the LBA to the storage device 1000 without the mapping information of the LBA (B). The FTL executed by the processor 220 fetches the received read command. When the mapping information corresponding to the received read command is not stored in the device memory 210, the controller 200 transfers the read command for reading the mapping information to the semiconductor memory device 100 (E). The semiconductor memory device 100 reads the mapping information corresponding to the received read command. In this operation, a time tR for reading the L2P map data including the corresponding mapping information from the memory cell array 110 of the semiconductor memory device 100 may be consumed. The semiconductor memory device 100 transfers the read mapping information to the controller 200 (F). In this operation, the received mapping information may be cached in the device memory 210. Based on the received mapping information, the FTL transfers the read command for reading data originally intended to be read, that is, user data, and the PA corresponding to the read command, to the semiconductor memory device 100 (G). The semiconductor memory device 100 reads the user data corresponding to the received read command. In this operation, a time tR for reading the user data from the memory cell array 110 may be consumed. The read user data is transferred to the controller 200 (H) and transferred from the controller 200 to the host 300 (I). The device interface 330 of the host 300 transfers the received user data to the file system 320 (J). Referring to FIG. 8A, when the mapping information corresponding to the read data is not stored in the device memory 210 and the host memory 310, a read time for reading the L2P map data is additionally consumed and the total read time consumed long.

An operation of a case where the mapping information corresponding to the read data is stored in the device memory 210 is shown in FIG. 8B. The device interface 330 transfers only the read command and the LBA of data to the storage device 1000 without the mapping information related to the LBA (B). The FTL executed by the processor 220 fetches the received read command. Since the mapping information corresponding to the received read command and its LBA is stored in the device memory 210, the processor 220 receives the mapping information from the device memory 210 (D). Based on the received mapping information, the FTL transfers the read command for reading the user data and a PA corresponding to the read command to the semiconductor memory device 100 (G). The semiconductor memory device 100 reads user data corresponding to the received read command. In this operation, a time tR for reading the user data from the memory cell array 110 may be consumed. The read user data is transferred to the controller 200 (H) and transferred from the controller 200 to the host 300 (I). The device interface 330 of the host 300 transfers the received user data to the file system 320 (J). Referring to FIG. 8B, when the mapping information corresponding to the read data is stored in the device memory 210, since the read time for reading the L2P map data is not consumed, the entire read time may be reduced.

An operation of a case where the mapping information corresponding to the read data is stored in the host memory 310, that is, the HPB read operation is shown in FIG. 8C. The device interface 330 transfers the mapping information received from the host memory 310 (C) to the storage device 1000 together with the read command (B). The FTL executed by the processor 220 fetches the received read command. In this process, the FTL determines whether the mapping information received from the host memory 310 is valid (K). When the mapping information received from the host memory 310 is valid, based on the received mapping information, the FTL transfers the read command for reading the user data and the PA corresponding to the read command to the semiconductor memory device 100 (G). The semiconductor memory device 100 reads the user data corresponding to the received read command. In this operation, a time tR for reading the user data from the memory cell array 110 may be consumed. The read user data is transferred to the controller 200 (H) and transferred from the controller 200 to the host 300 (I). The device interface 330 of the host 300 transfers the received user data to the file system 320 (3). Referring to FIG. 8C, when the mapping information corresponding to the read data is stored in the host memory 310, since the time for translating a logical address into a physical address is not consumed by the storage device 1000, the entire read time may be reduced.

Referring to FIGS. 8A to 8C, in comparison with a case where the mapping information corresponding to the read data is not stored in the host memory 310 and the device memory 210 (FIG. 8A), a read speed may be improved in a case where the corresponding mapping information is stored in the host memory 310 or the device memory 210 (FIGS. 8B and 8C).

Figure 9:
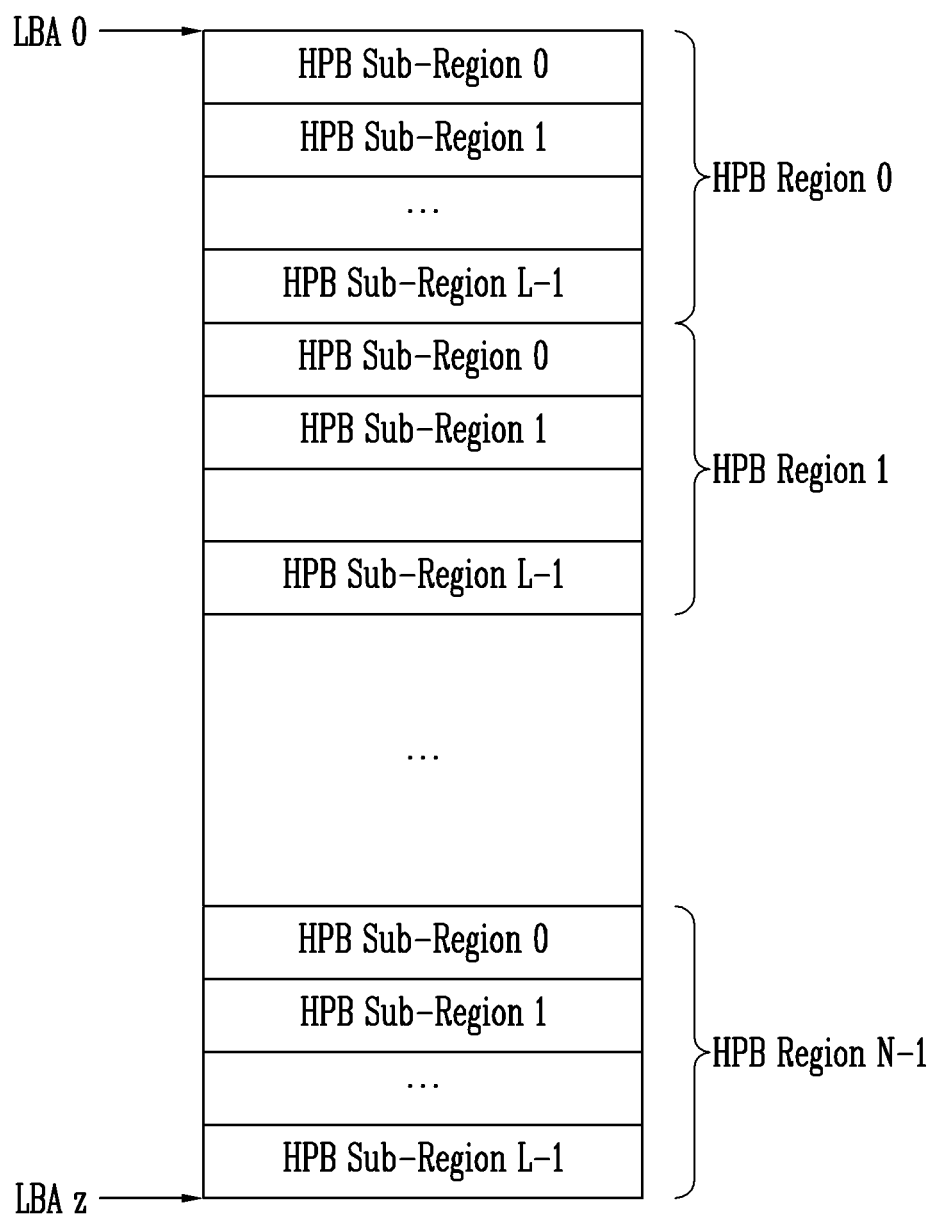
FIG. 9 is a diagram illustrating an HPB region and an HPB sub-region for an HPB cache.

FIG. 9 is a diagram illustrating an HPB region and an HPB sub-region within the host memory 310 or the HPB cache. In a definition for the HPB operation, the entire logical block address space is divided into a plurality of HPB regions. In FIG. 9, the logical block address space from a logical block address LBA 0 to a logical block address LBA z may be divided into N HPB regions, i.e., HPB Region 0, HPB Region 1, . . . , and HPB Region N−1. In an embodiment, each of the plurality of HPB regions, i.e., HPB Region 0, HPB Region 1, . . . , and HPB Region N−1, may be of the same size. In another embodiment, at least two of the HPB regions may be different sizes.

Each of the HPB regions, i.e., HPB Region 0, HPB Region 1, . . . , and HPB Region N−1, may include a plurality of HPB sub-regions. In an example of FIG. 9, each of the HPB regions may include L HPB sub-regions, i.e., HPB Sub-Region 0, HPB Sub-Region 1, . . . , and HPB Sub-Region L−1. In an embodiment, the plurality of HPB sub-regions may be of the same size. In another embodiment, at least two of the HPB sub-regions may be different sizes. Each of the HPB sub-regions may include a plurality of L2P mapping entries. One L2P mapping entry may be data indicating an L2P mapping relationship of a single page. In the HPB operation, the L2P map data may be cached in the host memory 310 in an HPB sub-region unit. In the HPB operation, the L2P map data cached in the host memory 310 may be discarded in an HPB region unit. The HPB sub-region cached in the host memory 310 is referred to as being "activated". The HPB sub-region that is not cached in the host memory 310 is referred to being "deactivated" (or "inactivated").

In the HPB operation, two HPB modes may be used. One is a host control mode and another is a device control mode. In the host control mode, the host determines the L2P map data to be cached in the host memory, and the host also determines the L2P map data to be discarded from the host memory. That is, the host may determine for itself the HPB sub-region to be activated and the HPB region to be deactivated. In the device control mode, the storage device 1000 selects the L2P map data to be cached in the host memory 310 and recommends the L2P map data to the host 300. The host 300 transfers an HPB read buffer command requesting the L2P map data, which is selectively recommended according to the recommendation from the storage device 1000, to the storage device 1000. The storage device 1000 reads the recommended L2P map data according to the received HPB read buffer command and transfers the recommended L2P map data to the host 300, and the host 300 stores the received L2P map data in the host memory 310. In addition, in the device control mode, the storage device 1000 selects the L2P map data to be discarded from the host memory 310 and recommends the L2P map data to the host 300. The host 300 discards the L2P map data that is selectively recommended according to the recommendation from the storage device 1000. The HPB operation according to the device control mode is described later with reference to FIGS. 10 and 11.

Figure 10:
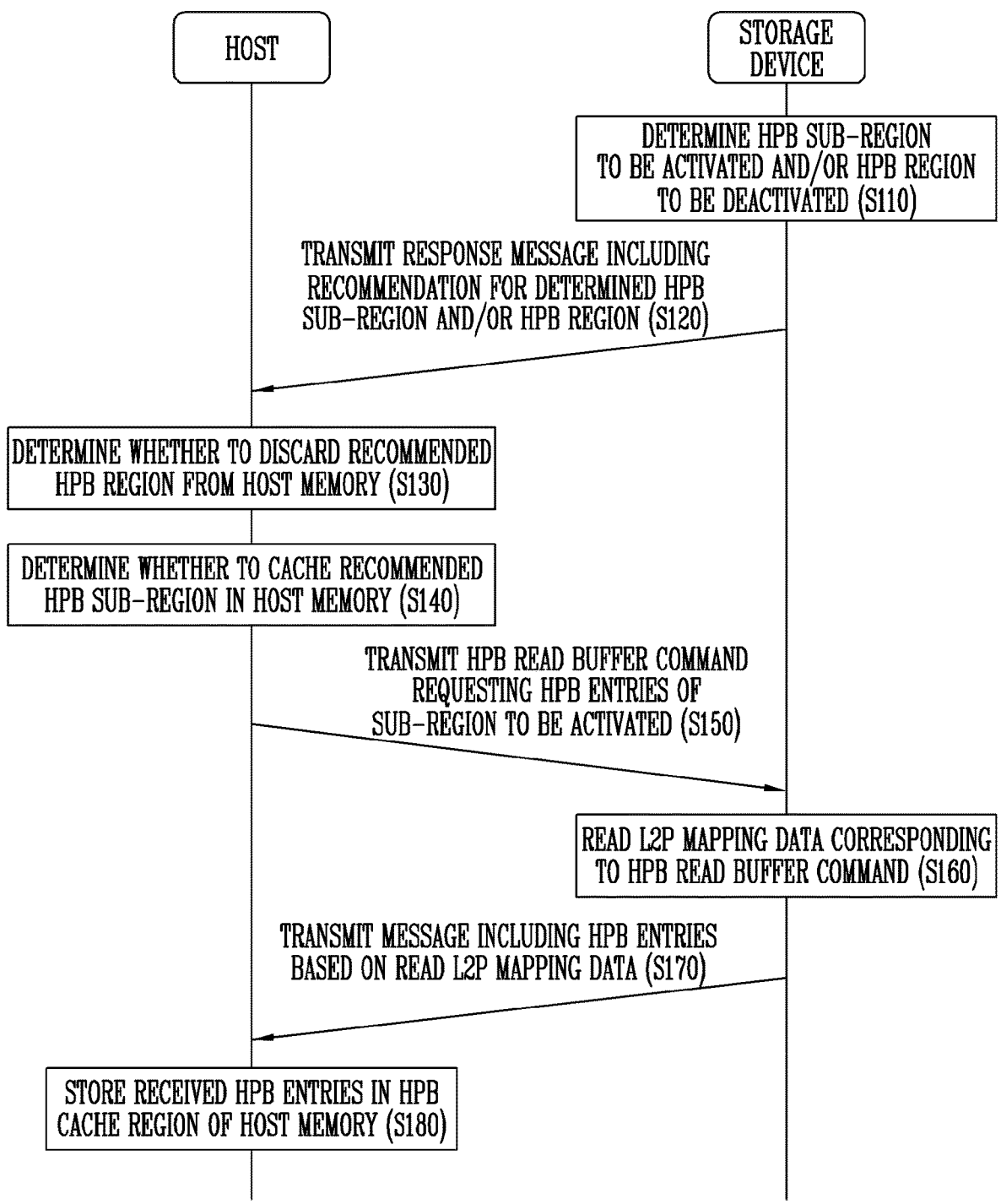
FIG. 10 is a diagram illustrating an HPB read buffer command and an operation according to the HPB read buffer command in a device control mode.

FIG. 10 is a diagram illustrating the HPB read buffer command and an operation according to the HPB read buffer command in the device control mode.

Referring to FIG. 10, the storage device 1000 determines the HPB sub-region to be activated and/or the HPB region to be deactivated (S110). That is, in operation S110, the storage device 1000 may determine the HPB sub-region including the L2P mapping entries to be cached in the host memory 310. In addition, in operation S110, the storage device 1000 may determine the HPB region including the L2P mapping entries to be discarded among the L2P mapping entries currently cached in the host memory 310. As described above, in the HPB operation, the L2P map data may be cached in the host memory 310 in the HPB sub-region unit, and the L2P map data cached in the host memory 310 may be discarded in the HPB region unit.

The storage device 1000 may transfer a response message including a recommendation for the HPB sub-region of which the activation is determined and/or the HPB region of which the deactivation is determined (S120). The response message transferred to the host 300 in operation S120 may be a response message indicating whether an operation command transferred from the host 300 to the storage device 1000 is completed before operation S110. As an example, the response message may be UFS protocol information units (UPIU). That is, the recommendation for the HPB sub-region of which the activation is determined and/or the HPB region of which the deactivation is determined may be included in the UPIU and transferred to the host 300.

In response to the recommendation for the HPB region of which the deactivation is determined, the host 300 may determine whether to discard the recommended HPB region from a host memory 310 (S130). When the host 300 determines to discard the corresponding HPB region, all L2P entries included in the recommended HPB region among the L2P entries included in the host memory 310 may be deleted. When the host 300 determines not to discard the HPB region, the L2P entries included in the corresponding HPB region in the host memory 310 may be maintained despite the recommendation from the storage 1000.

In response to the recommendation for the HPB sub-region of which the activation is determined, the host 300 may determine whether to cache the recommended HPB sub-region in the host memory 310 (S140). When the host 300 determines to cache the corresponding HPB sub-region, the host 300 transfers the HPB read buffer command requesting HPB entries of the sub-region to be activated to the storage device 1000, as shown in FIG. 10. (S150). The HPB entry provides a PBA corresponding to a specific LBA or information indicating such correspondence. As an example, a size of the HPB entry may be 8 bytes. In order to request the HPB entry for all LBAs included in the HPB sub-region, the HPB read buffer command for the corresponding HPB sub-region may be transmitted to the storage device 1000.

As shown in FIG. 10, when the host 300 determines not to cache the corresponding HPB sub-region, the L2P entries included in the HPB region in the host memory 310 may be maintained despite the recommendation from the storage device 1000.

In response to the HPB read buffer command by operation S150, the storage device 1000 reads the L2P mapping data corresponding to the HPB read buffer command (S160). As the response message to the HPB read buffer command, the storage device 1000 may transfer the message including the HPB entries based on the read L2P mapping data to the host 300 (S170).

The host 300 stores the received HPB entries in the HPB cache region of the host memory 310 (S180). Accordingly, the HPB entries corresponding to the HPB sub-region recommended from the storage device 1000 are cached in the host memory 310.

Figure 11:
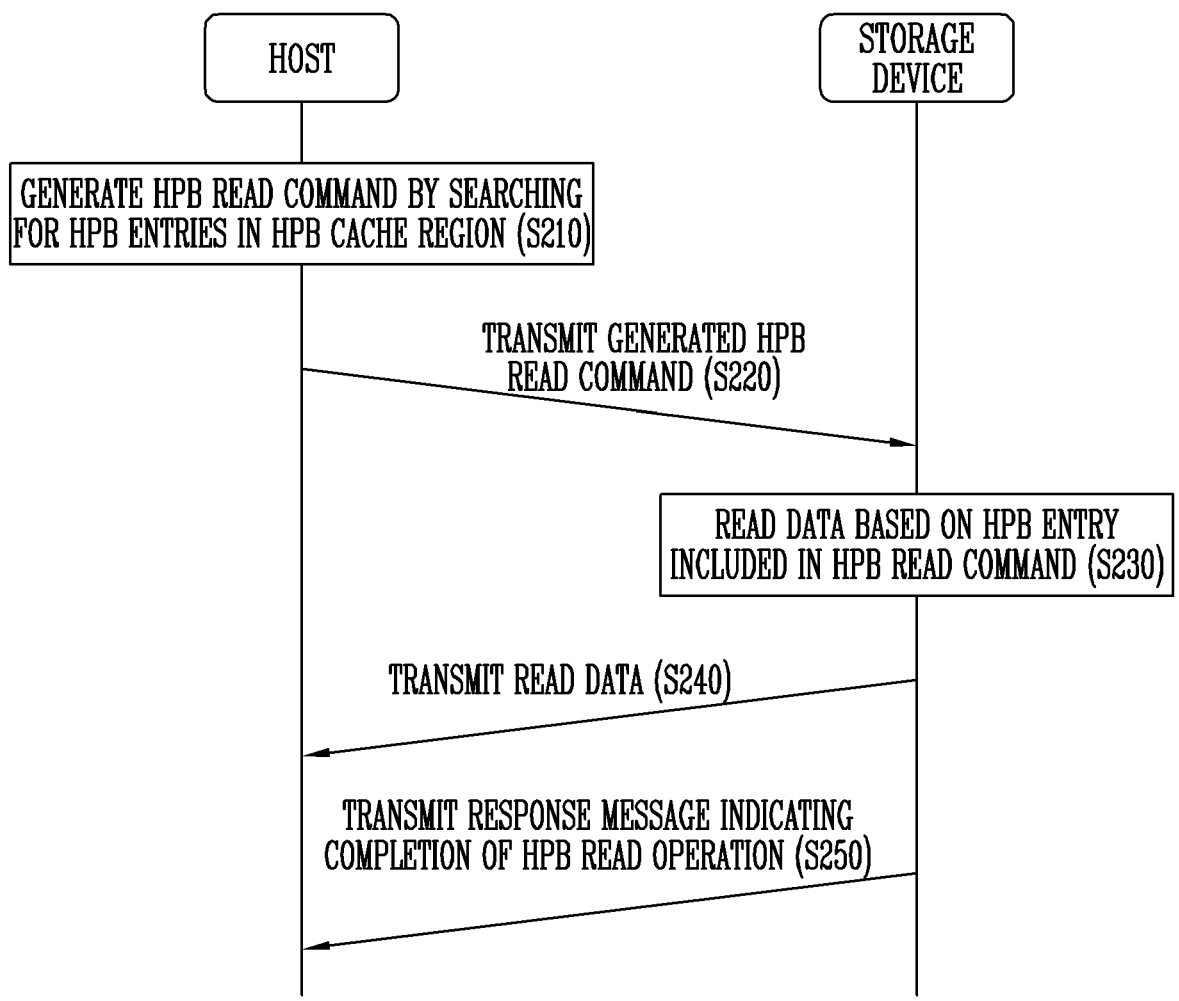
FIG. 11 is a diagram illustrating an HPB read command and an operation according to the HPB read command in the device control mode.

FIG. 11 is a diagram illustrating the HPB read command and an operation according to the HPB read command in the device control mode.

During the HPB read operation, the host 300 searches for the HPB entry corresponding to the LBA of data to be read in the HPB cache region in the host memory 310 and generates the HPB read command (S210). The host 300 transmits the generated HPB read command to the storage device 1000 (S220). The HPB read command includes the HPB entry found in the search.

Differently from FIG. 11, when the HPB entry corresponding to the LBA of data to be read is not found in the search, the host 300 may transfer the normal read command, which is different than the HPB read command, to the storage device.

In response to reception of the HPB read command, the storage device 1000 reads the data based on the HPB entry included in the HPB read command (S230). In this case, the storage device 1000 may first determine whether the HPB entry included in the received HPB read command is valid. When the data corresponding to the LBA is updated and the PBA is changed after the HPB entry is cached in the host memory 310, the HPB entry cached in the host memory 310 is no longer valid. Therefore, the storage device 1000 may read the data based on the corresponding HPB entry only when the HPB entry included in the received HPB read command is valid. When the HPB entry is not valid, the storage device 1000 may perform the read operation the same as when the normal read command, different than the HPB read command, is received.

The storage device 1000 transmits the read data to the host 300 (S240). In addition, the storage device 1000 transmits a response message indicating that the operation corresponding to the received read command is completed to the host 300 (S250). Regarding operation S120 of FIG. 10, the response message transferred to the host 300 may be a response message indicating whether an operation command transferred from the host 300 to the storage device 1000 before operation S110 is completed. In operation S250 of FIG. 11, the storage device 1000 may transmit a response message including a recommendation for the HPB sub-region of which the activation is determined and/or the HPB region of which the deactivation is determined to the host 300.

Figure 12:
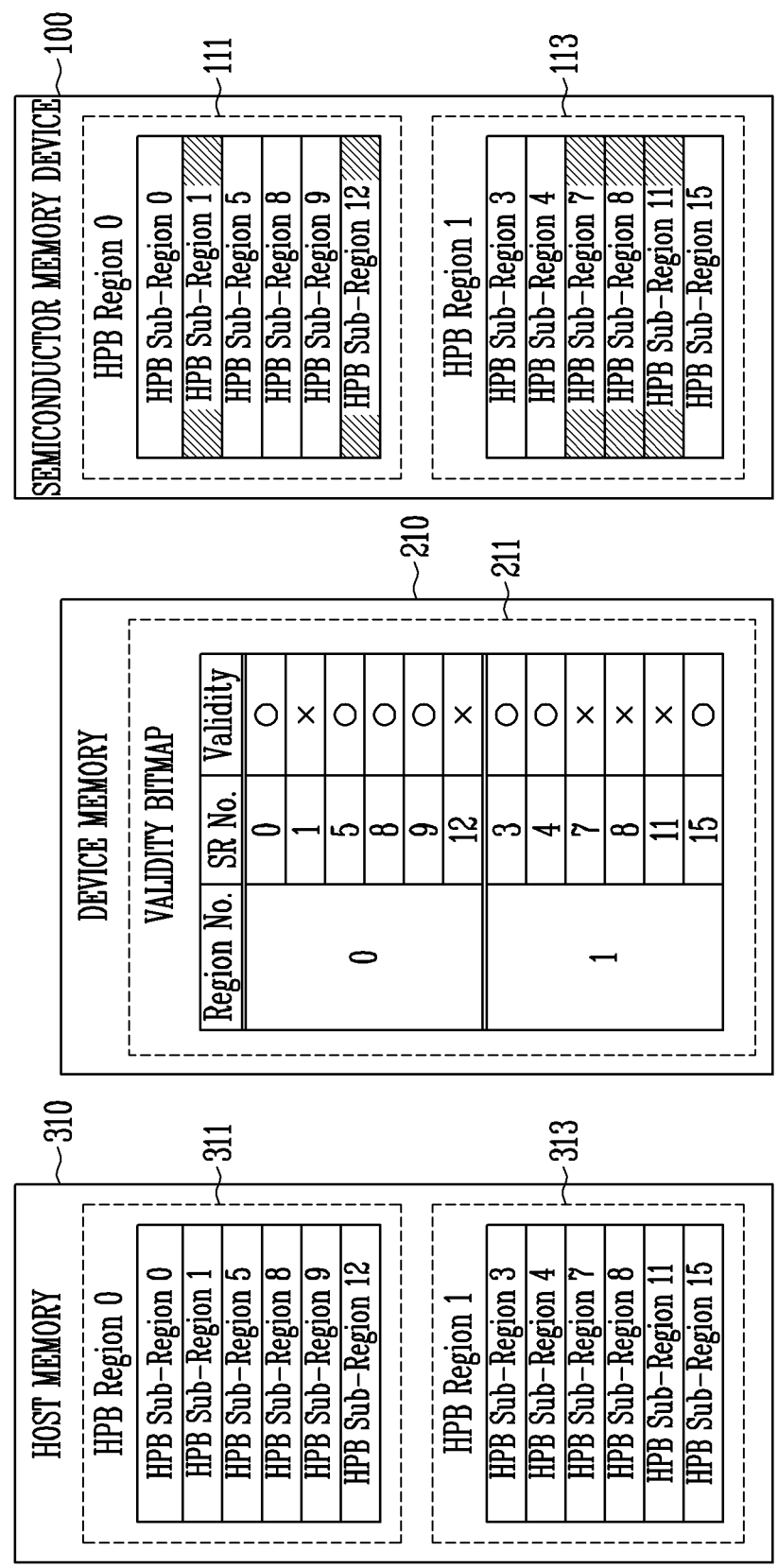
FIG. 12 is a diagram illustrating a method of managing a validity bitmap of HPB sub-regions included in an HPB region according to an embodiment of the present disclosure.

FIG. 12 is a diagram illustrating a method of managing a validity bitmap of the HPB sub-regions included in the HPB region according to an embodiment of the present disclosure.

Referring to FIG. 12, the host memory 310, the device memory 210, and the semiconductor memory device 100 are shown. It is shown that six HPB sub-regions, i.e., HPB Sub-Region 0, HPB Sub-Region 1, HPB Sub-Region 5, HPB Sub-Region 8, HPB Sub-Region 9, and HPB Sub-Region 12, included in HPB region 0 (311) and six HPB sub-regions HPB, i.e., Sub-Region 3, HPB Sub-Region 4, HPB Sub-Region 7, HPB Sub-Region 8, HPB Sub-Region 11, and HPB Sub-Region 15, included in HPB region 1 (313) are activated in the host memory 310.

The device memory 210 may store a validity bitmap 211. The validity bitmap 211 may be a table indicating whether an HPB entry included in an activated HPB sub-region is valid. The validity bitmap 211 includes a region number Region No. field in which the HPB regions are identified, a sub-region number SR No. listing each HPB sub-region with respect to the corresponding HPB region, and a Validity field indicating whether each HPB entry is valid.

Immediately after the L2P mapping data is cached in the host memory 310, all of the cached L2P mapping data may be valid. Therefore, when the L2P mapping data of a HPB sub-region is cached in the host memory 310, validity of the HPB sub-region is represented by 0 in the validity bitmap 211. Regarding the validity bitmap stored in the device memory 210, a fact that a HPB sub-region cached in the host memory 310 is valid means that all mapping information included in the HPB sub-region cached in the host memory 310 is the same as the most recent L2P mapping information stored in the semiconductor memory device 100.

The semiconductor memory device 100 may store L2P mapping data for the entire logical block address space. In FIG. 12, for convenience, only L2P mapping data corresponding to the HPB sub-regions activated in the host memory 310 among the entire L2P mapping data is shown.

That is, the semiconductor memory device 100 may store the L2P mapping data corresponding to six HPB sub-regions, i.e., HPB Sub-Region 0, HPB Sub-Region 1, HPB Sub-Region 5, HPB Sub-Region 8, HPB Sub-Region 9, and HPB Sub-Region 12 included in HPB region 0 (111) and L2P mapping data corresponding to six HPB sub-regions, i.e., HPB Sub-Region 3, HPB Sub-Region 4, HPB Sub-Region 7, HPB Sub-Region 8, HPB Sub-Region 11, and HPB Sub-Region 15 included in the HPB region 1 (113). In addition, the semiconductor memory device 100 may also store L2P mapping data corresponding to other HPB sub-regions that are not activated.

Immediately after the L2P mapping data is cached in the host memory 310, all cached L2P mapping data may be valid. Therefore, when the L2P mapping data of a HPB sub-region is cached in the host memory 310, validity of the HPB sub-region is represented by 0 in the validity bitmap 211. Regarding the validity bitmap stored in the device memory 210, that a HPB sub-region cached in the host memory 310 is valid means that all mapping information in the HPB sub-region cached in the host memory 310 is the same as the most recent L2P mapping information stored in the semiconductor memory device 100.

The storage device 1000 may perform an operation of changing a PBA of data without a request from the host 300. For example, the storage device 1000 may perform an internal operation such as a garbage collection operation, a data migration operation of an SLC buffer, a read reclaim operation, and a wear leveling operation, without a request from the host 300.

The garbage collection operation may be an operation of moving valid pages stored in victim blocks (which contain both valid and invalid pages) to a target block, which is a free block, so that the victim blocks can be erased. The data migration operation of the SLC buffer may be an operation of migrating and writing data, which is stored in an SLC block in the semiconductor memory device 100, in an MLC block, a TLC block, or a QLC block. The read reclaim operation may be an operation of newly writing data of a memory block, in which a threshold voltage distribution has deteriorated through repeated read operations after programming of data, to another memory block. The wear leveling operation may be an operation of moving data among memory blocks in the semiconductor memory device 100 to create more even use of the memory blocks. When a physical position of the data is changed by the internal operation as described above, since the PA is also changed, the valid L2P mapping data may be invalidated.

In FIG. 12, the HPB sub-regions including the L2P mapping data of which the PBA of data is changed after being cached in the host memory 310 are cached. For example, after two HPB sub-regions, i.e., HPB Sub-Region 1 and HPB Sub-Region 12, of HPB region 0 (111) and three HPB sub-regions, i.e., HPB Sub-Region 7, HPB Sub-Region 8, and HPB Sub-Region 11, of HPB region 1 (113) are cached in the host memory 310 (see the HPB regions 0 and 1 (311 and 313) cached in the host memory 310), at least one PBA of the L2P mapping data included in the HPB regions 0 and 1 (111 and 113) stored in the semiconductor memory device 100 is changed. That is, two HPB sub-regions, i.e., HPB Sub-Region 1 and HPB Sub-Region 12, of HPB region 0 (311) and three HPB sub-regions, i.e., HPB Sub-Region 7, HPB Sub-Region 8, and HPB Sub-Region 11, of HPB region 1 (313) among the L2P mapping data cached in the host memory 310 include invalid L2P mapping data.

Therefore, the storage device 1000 invalidates two HPB sub-regions HPB Sub-Region 1 and HPB Sub-Region 12 of HPB region 0 (111) and three HPB sub-regions HPB Sub-Region 7, HPB Sub-Region 8, and HPB Sub-Region 11 of HPB region 1 (113) stored in the semiconductor memory device 100. The storage device 1000 keeps the remaining HPB sub-regions as valid. The storage device 1000 may reflect the validity change of the HPB sub-regions stored in the semiconductor memory device 100 in the validity bitmap 211 stored in the device memory 210. Thereafter, the storage device 1000 checks the validity bitmap 211 to determine whether the HPB entry of the HPB read command received from the host 300 is valid.

According to the storage device 1000, the HPB region to be deactivated is determined based on the validity of respective HPB sub-regions included in each HPB region. A validity rate of a HPB region may be defined as the number of valid HPB sub-regions compared to the total number of HPB sub-regions included in the HPB region. In the example shown in FIG. 12, the validity rate of HPB region 0 (311) is 4/6, and the validity rate of HPB region 1 (313) is 1/2. Therefore, the storage device 1000 may determine the HPB region 1 (313) having a relatively low validity rate as the HPB region to be deactivated. In FIG. 12, an example in which only two HPB regions are activated is shown. When a plurality of HPB regions are activated, the HPB region having the lowest validity rate may be determined as the HPB region to be deactivated.

Figure 13:
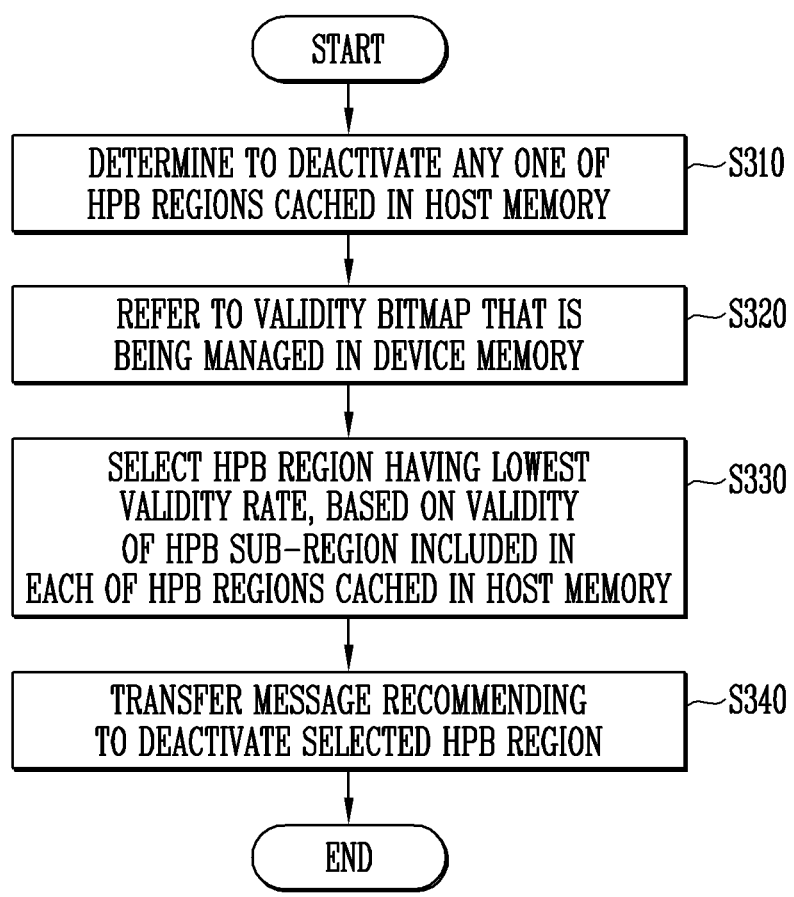
FIG. 13 is a flowchart illustrating a method of deactivating an HPB region according to an embodiment of the present disclosure.

FIG. 13 is a flowchart illustrating a method of deactivating the HPB region according to an embodiment of the present disclosure.

Referring to FIG. 13, according to an embodiment of the present disclosure, the storage device 1000 first determines to deactivate any one of the HPB regions cached in the host memory 310 (S310). The L2P mapping data of a certain level or more may be cached in the HPB cache region of the host memory 310. In this case, existing L2P mapping data may be discarded for additional caching. The storage device 1000 may perform the determination according to operation S310 in such a case. In response to the determination, the storage device 1000 refers to the validity bitmap 211 that is being managed in the device memory 210 (S320). The storage device 1000 selects the HPB region having the lowest validity rate based on the validity of the HPB sub-region included in each of the HPB regions cached in the host memory 310 (S330). In the example of FIG. 12, since HPB region 1 has the lowest validity rate, HPB region 1 (313) is selected as the HPB region to be deactivated. The storage device 1000 transfers the message recommending to deactivate the selected HPB region 1 (313) to the host 300 (S340). As described above, the recommendation may be included in the response message transferred in operation S120 of FIG. 10 or operation S250 of FIG. 11. In response to the recommendation, the host 300 may deactivate the HPB region 1 (313) including the six HPB sub-regions, i.e., HPB Sub-Region 3, HPB Sub-Region 4, HPB Sub-Region 7, HPB Sub-Region 8, HPB Sub-Region 11, and HPB Sub-Region 15 cached in the host memory 310. Accordingly, the L2P mapping data corresponding to the HPB region 1 (313) including the six HPB sub-regions, i.e., HPB Sub-Region 3, HPB Sub-Region 4, HPB Sub-Region 7, HPB Sub-Region 8, HPB Sub-Region 11, and HPB Sub-Region 15 is discarded from the host memory 310.

Figure 14A:
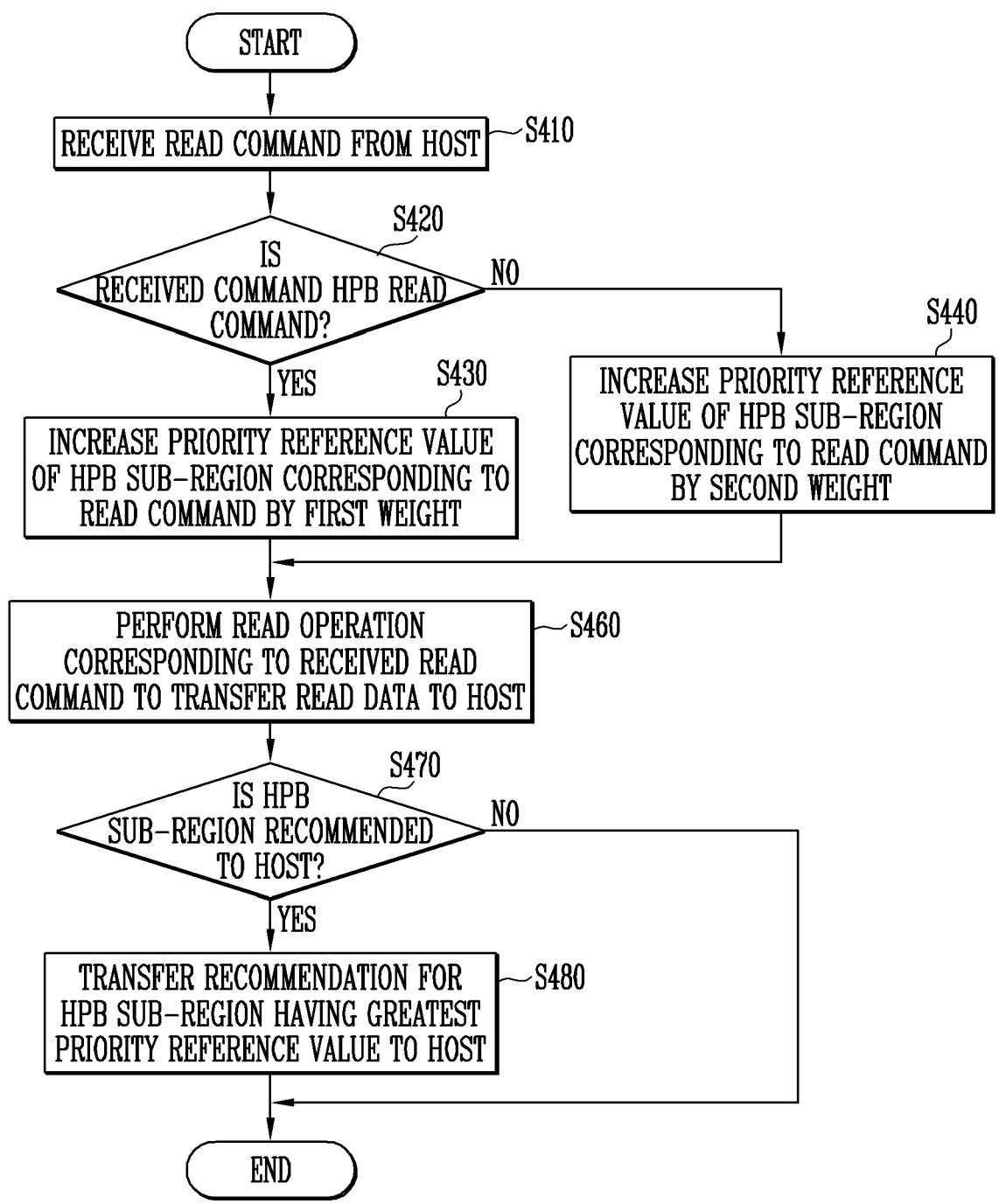
FIG. 14A is a flowchart illustrating a method of managing a priority reference value for activation of an HPB sub-region according to an embodiment of the present disclosure.

FIG. 14A is a flowchart illustrating a method of managing a priority reference value for the activation of the HPB sub-region according to an embodiment of the present disclosure. FIG. 14B is a diagram illustrating a priority table including the priority reference value managed according to FIG. 14A. As a reference for selecting the L2P mapping data to be cached in the host memory 310, the storage device 1000 may manage the table by storing the table as shown in FIG. 14B in the device memory 210. The priority table of FIG. 14b includes a region number Region No. field, a sub-region number SR No. field, and a Ref. Value field indicating the priority reference value of the corresponding HPB sub-region. When the storage device 1000 is turned on, all of the priority reference values of the priority table may be initialized to zero. Hereinafter, an operation of the storage device according to an embodiment of the present disclosure is described with reference to FIGS. 14A and 14B together.

Referring to FIG. 14A, first, the storage device 1000 receives the read command from the host 300 (S410). When the received read command is the HPB read command (S420: Yes), the storage device 1000 increases the priority reference value of the HPB sub-region corresponding to the read command by a first weight W1 (S430). On the other hand, when the received read command is the normal read command, not the HPB read command (S420: No), the storage device 1000 increases the priority reference value of the HPB sub-region corresponding to the read command by a second weight W2 (S440).

In an embodiment, the first weight W1 may be greater than the second weight W2. In order to less frequently replace the currently activated HPB sub-region with a new HPB sub-region in the host memory 310, the first weight W1 increased when receiving the HPB read command may be set to be greater than the second weight W2 increased when receiving the normal read command.

In another embodiment, the first weight W1 may be less than the second weight W2. To more frequently replace the currently activated HPB sub-region with a new HPB sub-region in the host memory 310, the second weight W2 increased when receiving the normal read command may be set to be greater than the first weight W1 increased when receiving the HPB read command.

Referring to FIG. 14B, after an initial initialization state, the storage device 1000 may receive one HPB read command for HPB sub-region 1 of HPB region 0 (Ref. Value=W1) and receive one normal read command for HPB sub-region 4 (Ref. Value=W2). In addition, after the initial initialization state, the storage device 1000 receive one normal read command for each of HPB sub-regions 2 and 3 of HPB region 1 (Ref. Value=W2) and receive one HPB read command for HPB sub-region 4 (Ref. Value=W1). As the storage device 1000 continues to receive read commands from the host 300, the priority table shown in FIG. 14B may also be updated multiple times to reflect the commands being received.

After updating the priority table according to operation S430 or operation S440, the storage device 1000 performs the read operation corresponding to the received read command, and transfers the read data to the host (S460).

Thereafter, additionally, the storage device 1000 determines whether to recommend the HPB sub-region to be activated to the host (S470). In a case where the HPB sub-region to be activated is recommended to the host (S470: Yes), the storage device 1000 may refer to the priority table. The storage device 1000 may transfer the recommendation for the HPB sub-region having the greatest priority reference value to the host 300 (S480). The recommendation may be transferred to the host 300 by including the recommendation in the response message to the read command received in operation S410.

According to an embodiment of the present disclosure, when receiving the read command, the storage device 1000 updates the priority reference value of the corresponding HPB sub-region based on whether the received read command is the HPB read command. Accordingly, the HPB cache region of the host memory 310 may be used more efficiently.

Figure 15A:
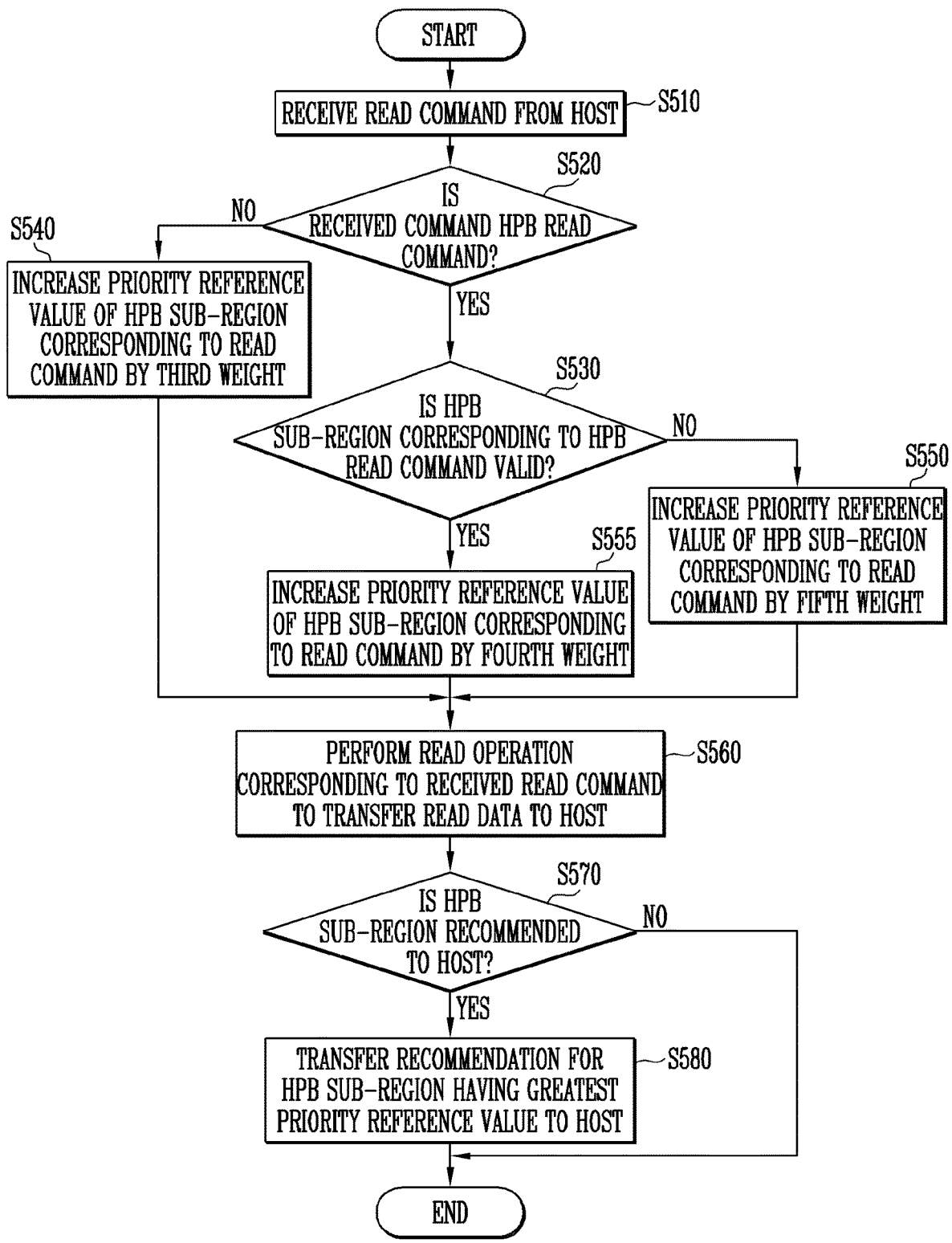
FIG. 15A is a flowchart illustrating a method of managing a priority reference value for activation of a HPB sub-region according to another embodiment of the present disclosure.
Figures 15B, 16:
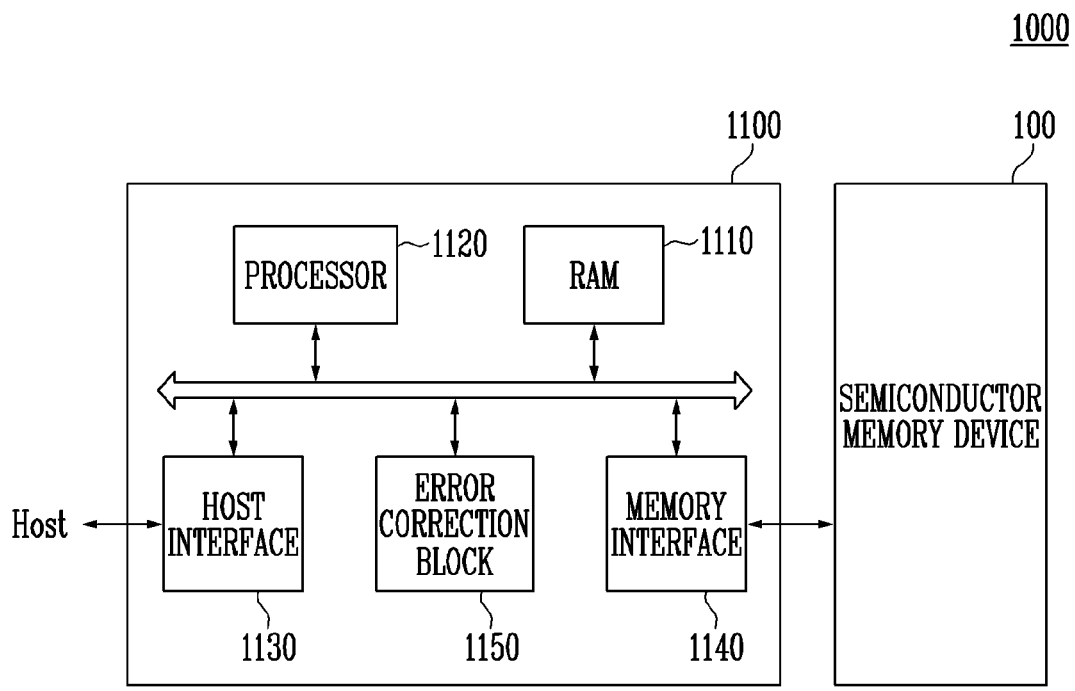
FIG. 15B is a diagram illustrating a priority table including a priority reference value managed according to FIG. 15A.
FIG. 16 is a block diagram illustrating a storage device including a semiconductor memory device and a controller.

FIG. 15A is a flowchart illustrating a method of managing a priority reference value for the activation of the HPB sub-region according to another embodiment of the present disclosure. FIG. 15B is a diagram illustrating a priority table including the priority reference value managed according to FIG. 15A. As a reference for selecting the L2P mapping data to be cached in the host memory 310, the storage device 1000 may manage the table by storing the table as shown in FIG. 15B in the device memory 210. Similarly to FIG. 14B, the priority table of FIG. 15b includes a region number Region No. field for listing the HPB regions, a sub-region number SR No. field for listing HPB sub-regions in association with their respective HPB regions, and a Ref. Value field indicating the priority reference value of each HPB sub-region. When the storage device 1000 is turned on, all of the priority reference values of the priority table may be initialized to zero. The embodiment of FIG. 15A is similar to the embodiment of FIG. 14A except that the priority table is updated by applying different weights according to whether the HPB sub-region corresponding to the received HPB read command is valid.

Hereinafter, an operation of the storage device according to an embodiment of the present disclosure is described with reference to FIGS. 15A and 15B together.

Referring to FIG. 15A, first, the storage device 1000 receives the read command from the host 300 (S510). Thereafter, it is determined whether the received read command is the HPB read command (S520).

When the received read command is the normal read command other than the HPB read command (S520: No), the storage device 1000 increases the priority reference value of the HPB sub-region corresponding to the read command by a third weight W3 (S540).

On the other hand, when the received read command is the HPB read command (S520: Yes), the storage device 1000 determines whether the HPB sub-region corresponding to the HPB read command is valid (S530). In operation S530, based on the validity bitmap 211 shown in FIG. 12, the validity of the HPB sub-region corresponding to the received HPB read command may be determined. When the HPB sub-region corresponding to the received HPB read command is valid (S530: Yes), the storage device 1000 increases the priority reference value of the HPB sub-region corresponding to the read command by a fourth weight W4 (S555). On the other hand, when the HPB sub-region corresponding to the received HPB read command is not valid (S530: No), the storage device 1000 increases the priority reference value of the HPB sub-region corresponding to the read command by a fifth weight W5 (S550).

In an embodiment, the third weight W3 may be greater than the fourth weight W4 or the fifth weight W5. To more frequently replace the currently activated HPB sub-region with a new HPB sub-region in the host memory 310, the third weight W3 increased when receiving the normal read command may be set to be greater than the fourth weight W4 or the fifth weight W5 increased when receiving the HPB read command.

In another embodiment, the third weight W3 may be less than the fourth weight W4 or the fifth weight W5. In order to less frequently replace the currently activated HPB sub-region with a new HPB sub-region in the host memory 310, the fourth weight W4 or the fifth weight W5 increased when receiving the HPB read command may be set to be greater than the third weight W3 increased when receiving the normal read command.

In an embodiment, the fifth weight W5 may be greater than the fourth weight W4. When the HPB sub-region corresponding to the HPB read command is invalid, this means that the currently activated HPB sub-region corresponding to the HPB read command is to be deactivated and an updated (thus valid) version of the HPB sub-region to be deactivated is activated. Therefore, when the HPB sub-region is invalid (S530: No), the fifth weight W5, which is an increase width of the priority reference value, may be set to be greater than the fourth weight W4, which is an increase width of a case where the HPB sub-region is valid (S530: Yes).

Referring to FIG. 15B, after an initial initialization state, the storage device 1000 may receive one normal read command for HPB sub-region 1 of HPB region 0 and HPB sub-region 1 of HPB region 1 (Ref. Value=W3). After the initial initialization state, the storage device 1000 may receive one HPB read command for each of HPB sub-region 3 of HPB region 0 and HPB sub-regions 3 and 4 of HPB region 1 (Ref. Value≠W3). In particular, HPB sub-region 3 of HPB region 0 corresponding to the received HPB read command may be currently valid (Ref. Value=W4). In addition, HPB sub-regions 3 and 4 of HPB region 1 corresponding to the received HPB read command may be currently invalid (Ref. Value=W5). As the storage device 1000 continues to receive read commands from the host 300, the priority table shown in FIG. 15B may also be updated multiple times to reflect to receive read commands.

After updating the priority table according to operation S540, S550 or operation S555, the storage device 1000 performs the read operation corresponding to the received read command to transfer the read data to the host (S560).

Thereafter, additionally, the storage device 1000 determines whether to recommend the HPB sub-region to be activated to the host (S570). In a case where the HPB sub-region to be activated is recommended to the host (S570: Yes), the storage device 1000 may refer to the priority table. The storage device 1000 may transfer the recommendation for the HPB sub-region having the greatest priority reference value to the host 300 (S580). The recommendation may be transferred to the host 300 by including the recommendation in the response message to the read command received in operation S510.

According to another embodiment of the present disclosure described through FIGS. 15A and 15B, when receiving the read command, the storage device 1000 updates the priority reference value of the corresponding HPB sub-region based on whether the received read command is the HPB read command. In addition, when the received read command is the HPB read command, the priority reference value is updated according to whether the corresponding HPB sub-region is valid. Accordingly, the HPB cache region of the host memory 310 may be used more efficiently.

FIG. 16 is a block diagram illustrating a storage device 1000 including a semiconductor memory device and a controller. Referring to FIG. 16, the storage device 1000 includes the semiconductor memory device 100 and the controller 1100.

The semiconductor memory device 100 of FIG. 16 may be configured and operate similarly to the semiconductor memory device 100 described with reference to FIG. 2. As such, description of those components is not repeated here.

The controller 1100 is connected to a host (Host) and the semiconductor memory device 100. The controller 1100 is configured to access the semiconductor memory device 100 in response to a command from the host. For example, the controller 1100 is configured to control read, program, erase, and background operations of the semiconductor memory device 100. The controller 1100 is configured to provide an interface between the semiconductor memory device 100 and the host. The controller 1100 is configured to drive firmware for controlling the semiconductor memory device 100.

The controller 1100 includes a random access memory (RAM) 1110, a processor 1120, a host interface 1130, a memory interface 1140, and an error correction block 1150.

The RAM 1110 is used as any of an operation memory of the processor 1120, a cache memory between the semiconductor memory device 100 and the host, and a buffer memory between the semiconductor memory device 100 and the host.

The processor 1120 controls overall operation of the controller 1100. The processor 1120 is configured to control the read program, erase, and background operations of the semiconductor memory device 100. The processor 1120 is configured to drive firmware for controlling the semiconductor memory device 100. The processor 1120 may perform a function of a flash translation layer (FTL). The processor 1120 may convert a logical block address (LBA) provided by the host device into a physical block address (PBA) through the FTL. The FTL may receive the logical block address (LBA) by using a mapping table and convert the LBA into the PBA. Any of several known address mapping methods of the FTL may be used depending on a mapping unit. For example, a page mapping method, a block mapping method, or a hybrid mapping method may be used as applicable. A size of the mapping table is different according to a type of a mapping system. The block mapping method requires a relatively small mapping table because the block mapping method provides mapping in a memory block unit. However, when data of a page included in a specific memory block is updated, other page data of the same memory block is also copied to a new memory block. Accordingly, random write performance is reduced. Conversely, the page mapping method adds all updated pages to a log block and maintains mapping information in a page unit. In order to improve the random write performance of data, the hybrid mapping method uses a combination of the page mapping method and the block mapping method.

The processor 1120 is configured to randomize data received from the host. For example, the processor 1120 may randomize the data received from the host using a randomizing seed. The randomized data is data to be stored, provided to the semiconductor memory device 100, and programmed in the memory cell array.

The processor 1120 is configured to de-randomize the data received from the semiconductor memory device 100 during the read operation. For example, the processor 1120 may de-randomize the data received from the semiconductor memory device 100 using a de-randomizing seed. The de-randomized data may be output to the host.

In an embodiment, the processor 1120 may perform randomization and de-randomization by driving software or firmware.

The host interface 1130 includes a protocol for performing data exchange between the host and the controller 1100. In an embodiment, the controller 1100 is configured to communicate with the host through at least one of various interface protocols such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer system interface (SCSI) protocol, an enhanced small disk interface (ESDI) protocol, an integrated drive electronics (IDE) protocol, and/or a private protocol.

The memory interface 1140 interfaces with the semiconductor memory device 100. For example, the memory interface 1140 includes a NAND interface or a NOR interface.

The error correction block 1150 is configured to detect and correct an error of data received from the semiconductor memory device 100 using an error correcting code (ECC). The error correction block 1150 may correct an error by using the ECC on read page data. The error correction block 1150 may correct an error by using a coded modulation such as a low density parity check (LDPC) code, a Bose, Chaudhri, Hocquenghem (BCH) code, a turbo code, a Reed-Solomon code, a convolution code, a recursive systematic code (RSC), a trellis-coded modulation (TCM), a block coded modulation (BCM), and a hamming code.

During a read operation, the error correction block 1150 may correct an error of the read page data. Decoding may be deemed a failure when the read page data includes error bits that exceed a correctable number of bits. The decoding may be deemed successful when the page data includes error bits equal to or less than the correctable number of bits. Successful decoding indicates that a read command passed. Failed decoding indicates that the read command failed. When the decoding is successful, the controller 1100 outputs the page data in which the error is corrected to the host.

The controller 1100 and the semiconductor memory device 100 may be integrated into one semiconductor device. In an embodiment, the controller 1100 and the semiconductor memory device 100 may be integrated into one semiconductor device to configure a memory card, such as a PC card (personal computer memory card international association (PCMCIA)), a compact flash card (CF), a smart media card (SM or SMC), a memory stick, a multimedia card (MMC, RS-MMC, or MMCmicro), an SD card (SD, miniSD, microSD, or SDHC), and/or a universal flash storage (UFS).

The controller 1100 and the semiconductor memory device 100 may be integrated into one semiconductor device to configure a semiconductor drive (solid state drive (SSD)). The semiconductor drive (SSD) includes a storage device configured to store data in the semiconductor memory. When the storage device is used as the semiconductor drive (SSD), an operation speed of the host connected to the storage device is dramatically improved.

As another example, the storage device 1000 is provided as one of various components of an electronic device such as a computer, an ultra-mobile PC (UMPC), a workstation, a net-book, a personal digital assistants (PDA), a portable computer, a web tablet, a wireless phone, a mobile phone, a smart phone, an e-book, a portable multimedia player (PMP), a portable game machine, a navigation device, a black box, a digital camera, a 3-dimensional television, a digital audio recorder, a digital audio player, a digital picture recorder, a digital picture player, a digital video recorder, a digital video player, a device capable of transmitting and receiving information in a wireless environment, one of various electronic devices configuring a home network, one of various electronic devices configuring a computer network, one of various electronic devices configuring a telematics network, an RFID device, or one of various components configuring a computing system.

In an embodiment, the semiconductor memory device 100 or the storage device may be mounted as a package of various types. For example, the semiconductor memory device 100 or the storage device may be packaged and mounted in a method such as a package on package (PoP), ball grid arrays (BGAs), chip scale packages (CSPs), plastic leaded chip carriers (PLCC), a plastic dual in line package (PDIP), a die in waffle pack, die in wafer form, a chip on board (COB), a ceramic dual in line package (CERDIP), a plastic metric quad flat pack (MQFP), a thin quad flat pack (TQFP), a small outline integrated circuit (SOIC), a shrink small outline package (SSOP), a system in package (SIP), a multi-chip package (MCP), a wafer-level fabricated package (WFP), or a wafer-level processed stack package (WSP).

Figure 17:
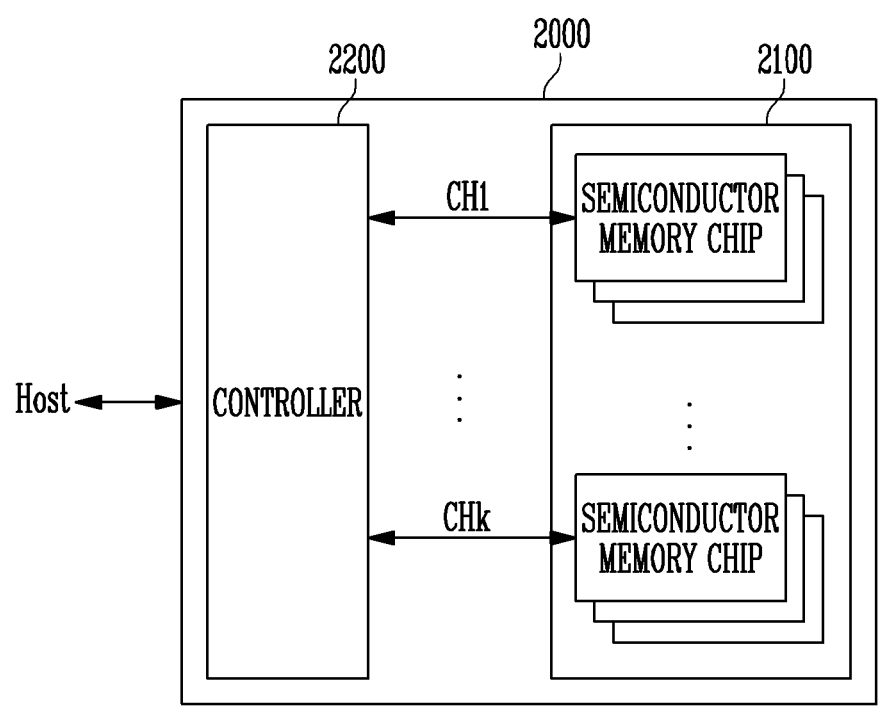
FIG. 17 is a block diagram illustrating an application example of a storage device, such as that of FIG. 16.

FIG. 17 is a block diagram illustrating an application example 2000 of the storage device of FIG. 16.

Referring to FIG. 17, the storage device 2000 includes a semiconductor memory device 2100 and a controller 2200. The semiconductor memory device 2100 includes a plurality of semiconductor memory chips. The plurality of semiconductor memory chips are divided into a plurality of groups, i.e., first to k-th groups.

In FIG. 17, the first to k-th groups communicate with the controller 2200 through first to k-th channels CH1 to CHk, respectively. Each semiconductor memory chip is configured and is operated similarly to the semiconductor memory device 100 described with reference to FIG. 2.

Each group is configured to communicate with the controller 2200 through one common channel. The controller 2200 is configured to control the plurality of memory chips of the semiconductor memory device 2100 through the plurality of channels CH1 to CHk.

In FIG. 17, the plurality of semiconductor memory chips are divided into groups, where each group is connected to one channel dedicated to that group. However, it will be understood that the storage device 2000 may be modified so that each semiconductor memory chip communicates with the controller 2200 through its own channel.

Figure 18:
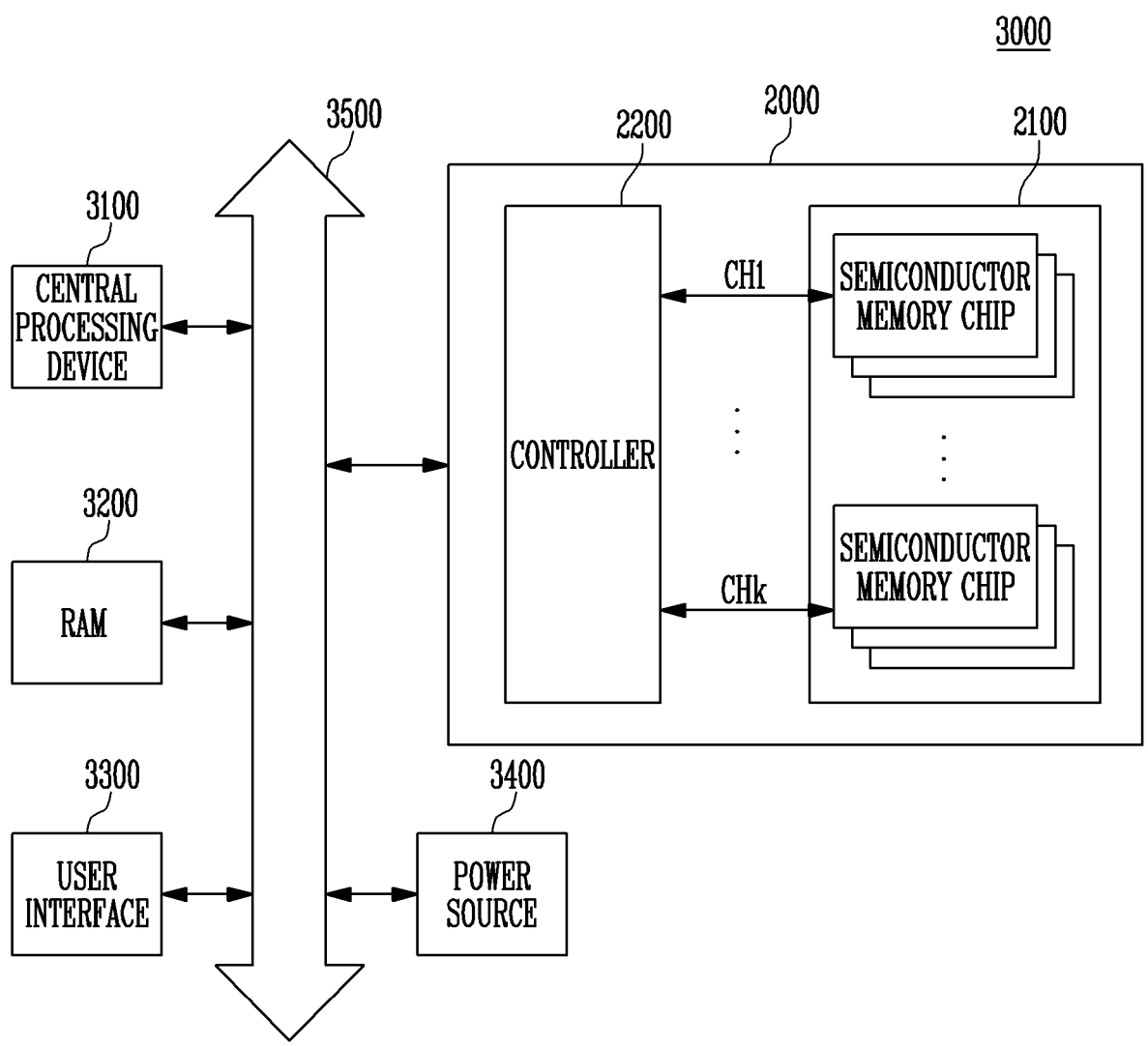
FIG. 18 is a block diagram illustrating a computing system including a storage device, such as that of FIG. 17.

FIG. 18 is a block diagram illustrating a computing system including the storage device described with reference to FIG. 17.

Referring to FIG. 18, the computing system 3000 includes a central processing device 3100, a random access memory (RAM) 3200, a user interface 3300, a power source 3400, a system bus 3500, and the storage device 2000.

The storage device 2000 is electrically connected to the central processing device 3100, the RAM 3200, the user interface 3300, and the power source 3400 through the system bus 3500. Data provided through the user interface 3300 or processed by the central processing device 3100 is stored in the storage device 2000.

The host 300 shown in FIGS. 1 and 7 may be configured of components different than those of the storage device 2000 of the computing system 3000. For example, the host 300 may be configured of the central processing device 3100, the RAM 3200, the user interface 3300, the power source 3400, and the system bus 3500 connecting them. In this case, the file system 320 may be implemented as a part of an operating system (OS) executed by the central processing device 3100. In addition, the host memory 310 may be implemented as a part of the RAM 3200.

In FIG. 18, the semiconductor memory chip 2100 is connected to the system bus 3500 through the controller 2200. However, the semiconductor memory chip 2100 may be configured to be directly connected to the system bus 3500. A function of the controller 2200 is performed by the central processing device 3100 and the RAM 3200.

In FIG. 18, the storage device 2000 described with reference to FIG. 17 is provided. However, the storage device 2000 may be replaced with the storage device 1000 described with reference to FIG. 16. In an embodiment, the computing system 3000 may be configured to include both of the storage devices 1000 and 2000 described with reference to FIGS. 16 and 17.

Although the present invention has been described in connection with various embodiments with reference to drawings, the present invention is not limited to the embodiments described above, as various changes and modifications may be made to any of the disclosed embodiments as those skilled in the art to which the present disclosure pertains will understand.

Therefore, the scope of the present invention is not limited to the described embodiments. Rather, the scope of the invention is determined by the claims and their equivalents.

In some cases, not all steps need necessarily be performed, nor do steps need necessarily be performed in the stated order. More generally, the embodiments disclosed herein are merely specific examples to enable those skilled in the art to practice the invention, not limit its scope. That is, those skilled in the art to which the present disclosure pertains will understand, based on the technical spirit of the present disclosure, that various modifications are possible.

What is claimed is:

1. A storage device communicating with a host including a host memory, the storage device comprising:
   a semiconductor memory device including a plurality of non-volatile memory cells; and
   a device memory configured to store a priority table for determining a host performance booster (HPB) sub-region to be cached in the host memory,
   wherein the storage device is configured to update the priority table based on a read command received from the host and to transfer, to the host, a message recommending the HPB sub-region to be cached in the host memory based on the priority table, and
   wherein the storage device is configured to change a priority of the HPB sub-region corresponding to a normal read command in response to receiving the normal read command, a priority of the HPB sub-region corresponding to a valid HPB read command in response to receiving the valid HPB read command, and a priority of the HPB sub-region corresponding to an invalid HPB read command in response to receiving the invalid HPB read command, differently from each priority.

2. The storage device of claim 1, wherein the priority table includes priority reference values for a plurality of HPB sub-regions, respectively, included in each of the plurality of HPB regions.

3. The storage device of claim 2,
   wherein the priority reference value of the HPB sub-region corresponding to a HPB read command received from the host is increased by a first weight in response to the HPB read command, and
   wherein the priority reference value of the HPB sub-region corresponding to a normal read command received from the host is increased by a second weight different from the first weight in response to the normal read command.

4. The storage device of claim 2,
   wherein the priority reference value of the HPB sub-region corresponding to a normal read command received from the host is increased by a third weight in response to the normal read command,
   wherein the priority reference value of the HPB sub-region corresponding to a HPB read command received from the host is increased by a fourth weight in response to the received HPB read command when the HPB sub-region corresponding to the received HPB read command is valid, and
   wherein the priority reference value of the HPB sub-region corresponding to the received HPB read command is increased by a fifth weight in response to the received HPB read command when the HPB sub-region corresponding to the received HPB read command is invalid.

5. The storage device of claim 4, wherein the fifth weight is greater than the fourth weight.

6. A method of operating a storage device communicating with a host including a host memory, the method comprising:
   receiving a read command from the host; and
   updating a priority reference value for determining a host performance booster (HPB) sub-region to be cached in the host memory based on a characteristic of the read command,
   wherein updating the priority reference value comprises:
      changing the priority reference value of the HPB sub-region corresponding to a normal read command in response to receiving the normal read command;
      changing the priority reference value of the HPB sub-region corresponding to a valid HPB read command in response to receiving the valid HPB read command; and
      changing the priority reference value of the HPB sub-region corresponding to an invalid HPB read command in response to receiving the invalid HPB read command.

7. The method of claim 6, wherein updating the priority reference value comprises:
   determining whether the read command is an HPB read command or the normal read command; and
   increasing the priority reference value of the HPB sub-region corresponding to the read command by a first weight or a second weight different from the first weight according to a result of the determining.

8. The method of claim 7, wherein, when the read command is the HPB read command, the priority reference value of the HPB sub-region corresponding to the read command is increased by the first weight.

9. The method of claim 7, wherein, when the read command is the normal read command, the priority reference value of the HPB sub-region corresponding to the read command is increased by the second weight.

10. The method of claim 6, wherein updating the priority reference value comprises:
    determining whether the HPB sub-region corresponding to an HPB read command is valid when the read command is the HPB read command; and
    increasing the priority reference value of the HPB sub-region corresponding to the HPB read command by a third weight or a fourth weight different from the third weight according to a result of the determining.

11. The method of claim 10, wherein, when the HPB sub-region corresponding to the HPB read command is valid, the priority reference value of the HPB sub-region is increased by the third weight.

12. The method of claim 10, wherein, when the HPB sub-region corresponding to the HPB read command is invalid, the priority reference value of the HPB sub-region is increased by the fourth weight.

13. The method of claim 6, further comprising: transferring read data to the host by performing a read operation corresponding to the read command.

14. The method of claim 13, further comprising: transferring, to the host, a message recommending caching the HPB sub-region having a greatest priority reference value in the host memory.

* * * * *